United States Patent
Matsushima

(10) Patent No.: US 6,256,079 B1
(45) Date of Patent: Jul. 3, 2001

(54) LIQUID CRYSTAL DISPLAY DEVICE, METHOD FOR MANUFACTURING THE SAME, AND METHOD FOR INSPECTING THE SAME

(75) Inventor: Yasuhiro Matsushima, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/948,583

(22) Filed: Oct. 10, 1997

(30) Foreign Application Priority Data

Nov. 18, 1996 (JP) .................................................. 8-305395
Jan. 31, 1997 (JP) .................................................. 9-018021
Mar. 6, 1997 (JP) .................................................. 9-051370

(51) Int. Cl.$^7$ .................................................. G02F 1/1335
(52) U.S. Cl. .................................................. 349/106; 349/108
(58) Field of Search ........................... 349/54, 55, 106, 349/108; 205/118, 122; 430/7

(56) References Cited

U.S. PATENT DOCUMENTS

| | | | | |
|---|---|---|---|---|
| 5,008,166 | * | 4/1991 | Aoki .................................... | 430/7 |
| 5,206,750 | * | 4/1993 | Aizawa et al. .................... | 349/106 |
| 5,503,732 | * | 4/1996 | Miyazaki et al. ................ | 205/122 |
| 5,576,730 | * | 11/1996 | Shimada et al. .................... | 345/98 |
| 6,011,607 | * | 1/2000 | Yamazaki et al. ................ | 349/153 |

FOREIGN PATENT DOCUMENTS

| | | |
|---|---|---|
| 3-87702 | 4/1991 | (JP) . |
| 5-5874 | 1/1993 | (JP) . |
| 5-22917 | 3/1993 | (JP) . |
| 10-161148 | * 6/1998 | (JP) . |

* cited by examiner

*Primary Examiner*—William L. Sikes
*Assistant Examiner*—Dung Nguyen
(74) *Attorney, Agent, or Firm*—Nixon & Vanderhye P.C.

(57) ABSTRACT

A liquid crystal display device is composed of (1) a first substrate which is equipped with at least gate bus-lines, source bus-lines, a switching element array, pixel electrodes, and a source driver and a gate driver for driving the switching electrode array, (2) a second substrate on which a counter electrode is provided, and (3) liquid crystal provided between the first and second substrates. A color filter formation-use driver is provided with respect to either the gate bus-lines or the source bus-lines, and color filters are formed on the pixel electrodes by the use of the color filter formation-use driver. By doing so, color filters can be formed in a simple and easy manner, with input of a small number of signals, without using the drivers which are designed for driving the liquid crystal display device.

22 Claims, 17 Drawing Sheets

LIQUID CRYSTAL DISPLAY DEVICE, METHOD FOR MANUFACTURING THE SAME, AND METHOD FOR INSPECTING THE SAME

FIELD OF THE INVENTION

The present invention relates to a liquid crystal display device in which color filters are provided on a TFT substrate, a method for manufacturing the same, and a method for inspecting the same.

BACKGROUND OF THE INVENTION

Recently, vigorous attempts to develop an active matrix-type liquid crystal display (LCD) device in which thin film transistors are incorporated as switching elements for driving the liquid crystal have been conducted.

One example of such LCD device is illustrated by a schematic plan view of FIG. 6. On a substrate 31 made of glass or quartz, a gate driver 32, a source driver 33, and a TFT (thin film transistor) array section 34 are installed. The gate driver 32 is composed of a shift register 32a and a buffer 32b. The source driver 33 is composed of a shift register 33a, a buffer 33b, and analog switches 39 for sampling video lines 38. In the TFT array section 34, there are provided a plurality of gate bus-lines 116 which originate from the gate driver 32 and are parallel to each other. A plurality of source bus-lines 120 originate from the source driver 33, and extend so as to orthogonaly cross the gate bus-lines 116. Besides, additional capacity common lines 114 are provided parallel to the gate bus lines 116.

In each rectangular region surrounded by two gate bus-lines 116, two source bus-lines 120, and two additional capacity common lines 114, there are provided a TFT 35, a pixel 36, and an additional capacity 37. A gate electrode of the TFT 35 is connected with one of the gate bus-lines 116, while a source electrode thereof is connected with one of the source bus-lines 120. Liquid crystal is sealed into between a pixel electrode connected with a drain electrode of the TFT 35 and a counter electrode on a counter substrate, thereby constituting the pixel 36. The additional capacity common line 114 is connected to an electrode having the same potential as that of the counter electrode.

Usually, on an inner surface of the counter substrate, there are provided a black matrix to prevent light from leaking from gaps between the pixel electrodes, as well as color filters of red color (color R), color filters of green color (color G), and color filters of blue color (color B) which correspond to pixel electrodes, respectively. On top of the black matrix and the color filters, the counter electrode is provided, which is composed of a transparent conductive film. Thus, in the case where the black matrix and the color filters are provided on the counter substrate, it is necessary to form the black matrix larger than a desired size, since an assembling error tends to occur when the TFT substrate and the counter substrate are combined. As a result, an aperture ratio decreases. In the case where the color filters are formed on the counter substrate, it is necessary to form color filters to a required shape and size accurately. Therefore, a photo-lithography process is required, thereby raising a manufacturing cost.

To solve this problem, providing the color filters on the TFT substrate has been proposed, as is in the Japanese Publication for Laid-Open Patent Application No.5-5874/1993 (Tokukaihei No.5-5874). This is a method for forming filters of the colors R, G, and B on the pixel electrodes not by the photo-lithography process but by the electro-deposition process. In this conventional case, scanning voltages are sequentially applied to the gate bus-lines so that the pixel electrodes are subjected to application of voltages, while in synchronization with this, voltages for forming electro-deposited color filters on the correspondent pixel electrodes are applied to the source bus-lines. Thus, at each step of the sequential selection of the gate bus-electrode, one gate bus-line is selected and a voltage is applied from the source bus-lines to certain pixel electrodes among the pixel electrodes connected to the selected gate bus-line. As a result, electro-deposited color filters are formed on the pixel electrodes to which the voltage has been applied.

However, in the aforementioned conventional case, it is required to apply signals sequentially to the gate bus-lines and the source bus-lines, and for this purpose, it is necessary to make the gate driver and the source driver operate. Therefore, many signals have to be supplied to the drivers, thereby making the color filter formation process complicated.

Specifically, regarding a driver-incorporated LCD device in which the drivers and the TFT array are provided on the same substrate, since the drivers are made of polycrystalline silicon which has less mobility as compared with monocrystal, a plurality series of shift registers are provided so that the shift registers may respectively have lower operational frequencies. By doing so, the LCD device in which drivers made of polycrystalline silicon are integrated is realized, as disclosed in the Japanese Examined Patent Publication No.5-22917/1993 (Tokukohei No.5-22917). For example, in order to drive an LCD device with not less than 800 signal lines by the use of an element made of polycrystalline silicon with a mobility of about 100 to 150 (cm$^2$/v·sec), the element should be equipped with at least four series of shift registers, or preferably, eight series of shift registers.

FIG. 7 illustrates an arrangement example wherein four series of shift registers 331 through 334 are provided in the source driver 33 so that each operational frequency of the shift registers is lowered. In FIG. 7, the gate driver 32 and the source driver 33 are connected with the TFT array section 34. The shift registers 331 through 334 provided in the source driver 33 are connected with every four source bus-lines, respectively, through analog switches 39. Besides, three video lines 38, for example, are connected with each analog switch 39.

As to the shift registers 331 through 334, it is necessary to supply, for example, the shift register 331 with at least a start pulse SP, a clock signal CK1, and an signal /CK1 which is an inverted signal of the signal CK1, and to supply the shift register 332 with at least a start pulse SP, a clock signal CK2, and a signal /CK2 which is an inverted signal of the signal CK2. The other shift registers should be similarly arranged.

Therefore, in the case where there are provided eight series of shift registers, 2×8=16 clock signals should be supplied solely to the shift register series, thereby making a device for supplying the signals complicated. Moreover, similarly, start pulses SPG, clock signals GCK, and signals /GCK which are inverted signals of the clock signals GCK are supplied to the gate driver 32.

Furthermore, in the case where color filters are formed by the use of the drivers for driving the LCD device, the following occur: after such costly drivers are connected with a substrate, the drivers are damaged by static electricity through a later process, for example, through a rubbing process, and hence the drivers have to be removed. Thus, this method has a drawback in that the same drivers are not used in the LCD device.

Another method for forming the color filters is disclosed by the Japanese Publication for Laid-Open Patent Application No.3-87702/1991 (Tokukaihei No.3-87702). This is a method whereby a voltage is simultaneously applied to a group of pixels on which color filters of one same color are provided, so that the color filters of the same color are formed in a single step.

However, in the conventional case, the gate bus-lines, source bus-lines corresponding to pixels of the color R, source bus-lines corresponding to pixels of the color G, and source bus-lines corresponding to pixels of the color B are at least separately provided when the electro-deposited color filters are formed, and three signal input terminals are needed for supplying signals for color filter formation. Therefore, in respective color filter formation processes for the colors R, G, and B, it is required to supply signals to different signal input terminals, and hence it is required to switch the input terminals before the second color filter formation process and before the third color filter formation process, respectively.

Furthermore, in none of the conventional cases, consideration is taken regarding a method for forming light shielding films on the TFTs.

In the aforementioned conventional case, in order to form a plurality of TFT substrates out of one substrate, it is required to repeat the color filter formation process three times respectively for the colors R, G, and B with respect to every TFT substrate. Therefore, in the case where, for example, three TFT substrates are formed out of one substrate, the color filter formation process has to be repeated 9 times (=3 (colors R, G, and B)×3 (substrates)).

As mentioned before, in the aforementioned conventional case, it is required that the gate bus-lines, source bus-lines corresponding to pixels of the color R, source bus-lines corresponding to pixels of the color G, and source bus-lines corresponding to pixels of the color B are at least separately provided when the electro-deposited color filters are formed. However, in the case where the bus-lines are separately provided in a previous process or a subsequent process, the TFTs are damaged, for example, by static electricity, and such breakdown of the TFTs leads to dot-like display defects in a display section of the LCD device.

SUMMARY OF THE INVENTION

The object of the present invention is to provide an LCD device in which color filters can be easily formed, a method for manufacturing the same, and a method for inspecting the same.

To achieve the above object, a liquid crystal display device of the present invention is characterized in comprising (1) a first substrate having gate bus-lines, source bus-lines, a switching element array, pixel electrodes, and a source driver and a gate driver for driving the switching element array, (2) a second substrate having a counter electrode, and (3) liquid crystal provided between the first and second substrates, wherein a color filter formation-use driver is provided with respect to at least either the gate bus-lines or the source bus-lines, so that color filters are formed on the pixel electrodes by the use of the color filter formation-use driver.

With the aforementioned arrangement, no high-cost driver IC is required for driving the LCD device of the present invention, and the color filter formation-use driver needs less input signal terminals. Therefore, the formation of the color filters can be carried out in a simple and easy manner.

A method of the present invention for manufacturing a liquid crystal display device which has a first substrate, a second substrate having a counter electrode, and liquid crystal provided between the first and second substrates, the first substrate having gate bus-lines, source bus-lines, a switching element array, pixel electrodes, and a source driver and a gate driver for driving the switching element array, is characterized in comprising the steps of (1) providing the gate driver and the source driver on an end side of the gate bus-lines and on an end side of the source bus-lines, respectively, and providing a color filter formation-use driver either on the other end side of the gate bus-lines or on the other end side of the source bus-lines, and (2) inspecting whether or not the gate driver or the source driver have any defects, by the use of the color filter formation-use driver.

According to the aforementioned inspection method, a specific inspection device for inspecting defects of the drivers is not needed but substituted by the color filter formation-use driver. Therefore, the inspection of defects can be easily and smoothly carried out. In the case where either the source driver or the gate driver has defects, operations of subsequent processes are not applied to the substrate, reducing wasteful application of processing operations. As to some types of defects, they can be repaired so that the substrate satisfies requirements in quality.

Furthermore, a method of the present invention for manufacturing a liquid crystal display device, which a first substrate, a second substrate having a counter electrode, and liquid crystal provided between the first and second substrates, the first substrate being equipped with gate bus-lines, source bus-lines, a switching element array, pixel electrodes, and color filters, the pixel electrodes and the color filters being formed so as to correspond to switching elements of the switching element array, is characterized in comprising the steps of (a) forming an insulating film over the pixel electrodes after the pixel electrodes are formed, (b) forming first contact holes in the insulating film, and forming first color filters in apertures of the first contact holes by utilizing the pixel electrodes, (c) forming second contact holes in the insulating film, and forming second color filters in apertures of the second contact holes by utilizing the pixel electrodes, and (d) forming third contact holes in the insulating film, and forming third color filters in apertures of the third contact holes by utilizing the pixel electrodes.

According to the aforementioned method, there should be provided only one input terminal for forming the color filters, and the formation of the color filters of the colors R, G, and B can be carried out with all the TFTs turned on. Therefore, there is no need to switch input terminals for forming the second-color or third-color filters.

Furthermore, a method of the present invention for manufacturing a liquid crystal display device, whereby a plurality of TFT substrates are manufactured on one insulating substrate, is characterized in comprising the steps of (1) forming gate-use short rings by short-circuiting gate bus-lines of the TFT substrates, and forming three series of source-use short rings by short-circuiting short rings on the TFT substrates so that short rings belonging to a same series are short-circuited with each other, and (2) sequentially forming color filters on the TFT substrates by applying a voltage to the gate-use short rings while applying voltages to the source-use short rings.

According to the aforementioned manufacturing method, the formation of the color filters of the colors R, G, and B is finished through a single step each. Therefore, the color filter formation process can be drastically simplified. Besides, since the color filter formation-use signals are inputted by using the short rings without operations of the drivers, only a small number of signals are required, and hence the formation of the color filters can be carried out in a simple and easy manner.

For a fuller understanding of the nature and advantages of the invention, reference should be made to the ensuing detailed description taken in conjunction with the accompanying drawings.

DESCRIPTION OF THE PREFERRED EMBODIMENTS

First Embodiment

Figure 1:
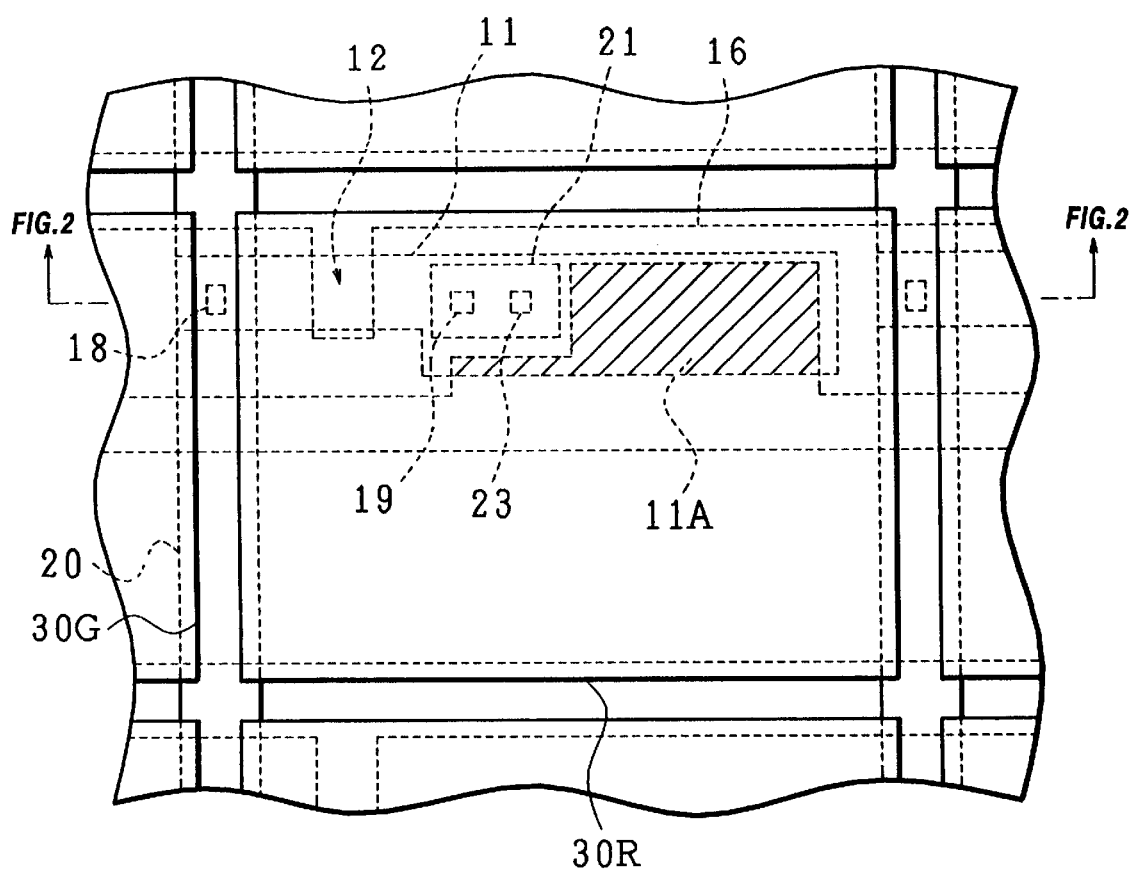
FIG. 1 is a plan view illustrating one pixel portion of the LCD device in accordance with the first and fifth embodiments of the present invention.
Figure 2:
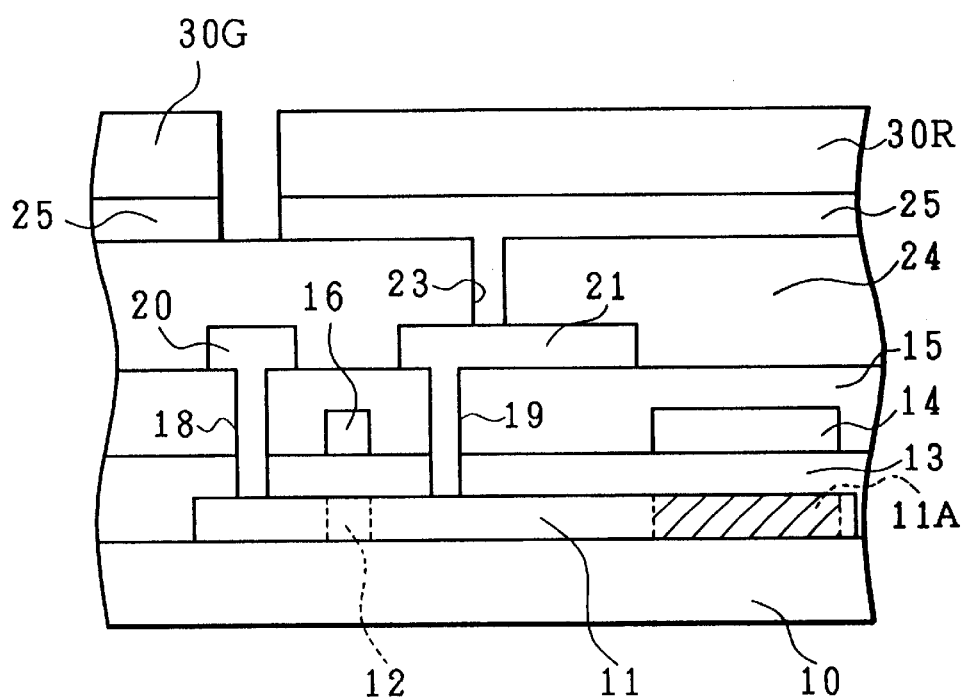
FIG. 2 is a cross-sectional view of the portion along an A—A arrow line in FIG. 1.
Figure 3:
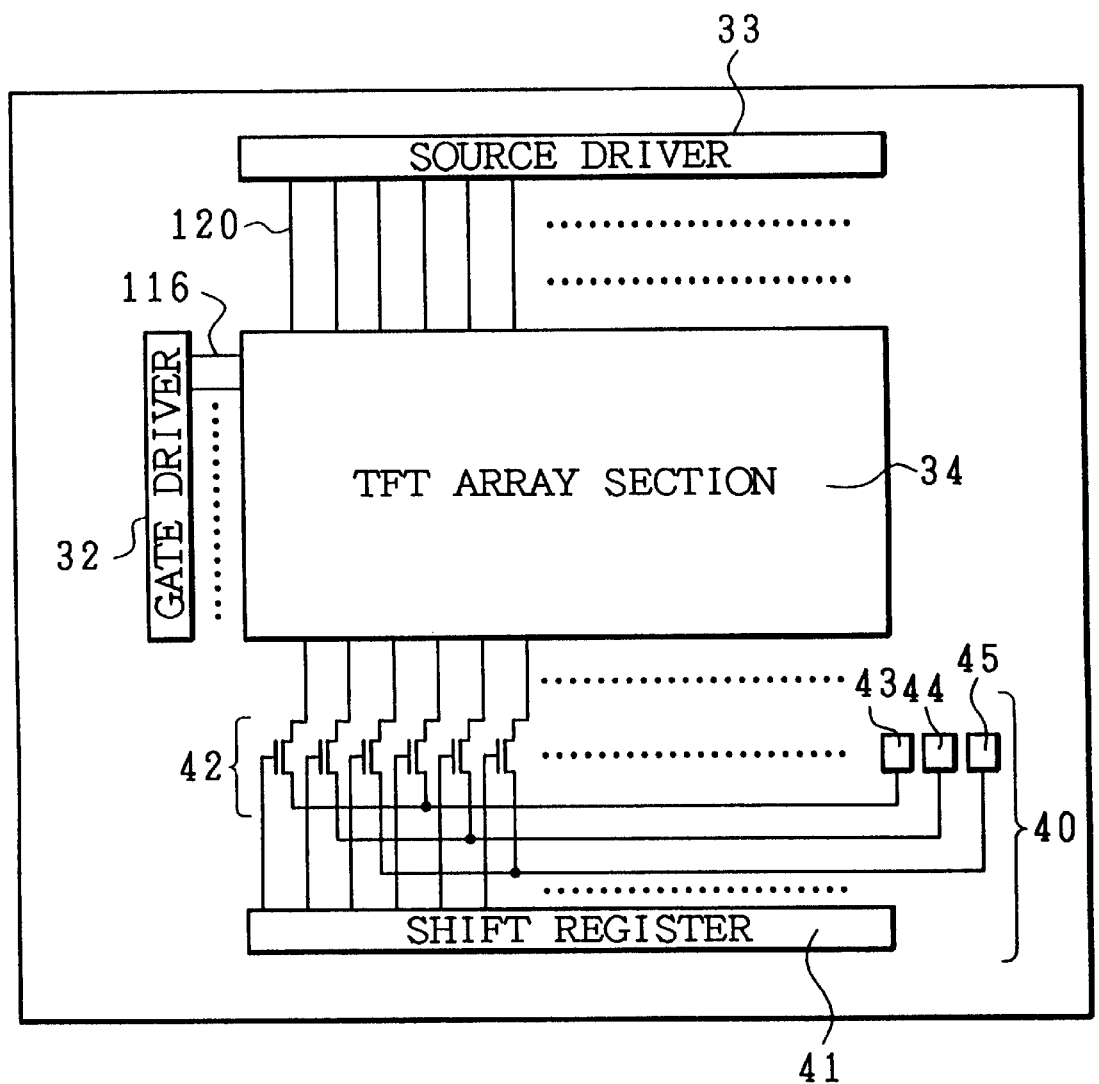
FIG. 3 is a view illustrating an arrangement of the LCD device.

The following description will explain a first embodiment of the present invention, while referring to FIGS. 1 through 3. FIG. 1 is a layout of one pixel in accordance with the first embodiment, while FIG. 2 illustrates a cross section of the pixel along an arrow line A—A in FIG. 1.

As illustrated in FIG. 2, a polycrystalline silicon thin film 11 to function as an active layer is formed to a thickness of 40 nm to 80 nm, on an insulating substrate 10. Then, by the sputtering method or the CVD method, a gate insulating film 13 is formed with $SiO_2$ or $SiN_x$ to a thickness of 80 nm. Subsequently, phosphorus ions are implanted to a hatched additional capacity region 11A at a rate of $1\times10^{15}$ ($cm^{-2}$), so that the region has a low resistance. This additional capacity region 11A constitutes an additional capacity lower electrode. Thereafter, an additional capacity upper electrode 14 and a gate electrode 16 are formed with Al or polycrystalline silicon.

Then, to determine a type of conductivity of the TFT thus formed, phosphorus ions are implanted thereto at a rate of $1\times10^{15}$ ($cm^{-2}$) from above the gate electrode 16 with the gate electrode 16 used as mask, so that a non-doped channel section 12 is formed in the active layer below the gate electrode 16 and the other region than the channel section 12 become a high-density impurity region. In the active layer of the TFT, a low-density impurity region or a non-doped region may be provided in the vicinity of the channel section 12, so that the TFT has small leakage of electricity when it is in the OFF state.

After a first inter-layer insulating film 15 is formed all over the TFT, a contact hole 18 and a contact hole 19 are formed. Then, a source bus-line 20, and a source electrode and a drain electrode 21 resulting on extension of the source bus-line 20 are formed with a metal having a low resistance, such as Al.

Subsequently, a second inter-layer insulating film 24 is formed. For example, a transparent, photosensitive organic film may be formed as such by the spin coating method. In the present embodiment, since this TFT substrate (first substrate) is for the use in a transparent-type LCD device, not a colored organic material but a transparent acrylic resin is used as a material for the second inter-layer insulating film 24. Since the second inter-layer insulating film 24 has a dielectric constant of as small as 4 and a thickness of not less than 2 $\mu$m, it is not affected by an electric field below the insulating film. Therefore, it is possible to suppress reverse tilt of a liquid crystal material, which tends to occur when a voltage is applied to a liquid crystal layer.

Thereafter, a contact hole 23 is formed above the drain electrode 21, and a pixel electrode 25 is formed over the contact hole 23 with a transparent conductive film material such as ITO. The pixel electrodes 25 are formed at least on apertures of the TFT substrate.

Subsequently, the TFT substrate is soaked in an electrodeposition solution for the color R. By applying an electrodeposition voltage to pixel electrodes for the color R, electro-deposited color filters 30R of the color R are formed on the pixel electrodes. Likewise, electro-deposited color filters 30G of the color G, and then, electro-deposited color filters (not shown) of the color B are formed. In the present embodiment, the formation of the color filters is carried out by a driver IC designed for this purpose.

FIG. 3 illustrates an arrangement example in accordance with the present embodiment, wherein a color filter formation-use driver 40 is provided for forming color filters in a stripe form. In a finishing process, the gate driver 32 and the source driver 33 are connected with the TFT array section (switching element array) 34. In the present embodiment, the color filter formation-use driver 40 is connected with a side of the TFT array section 34, which is opposite to a side of the same with which the source driver 33 is connected. Note that in the TFT array section 34, there are provided a plurality of gate bus-lines 116 which originate from the gate driver 32 and are parallel to each other. A plurality of source bus-lines 120 originate from the source driver 33, and extend so as to orthogonaly cross the gate bus-lines 116.

The color filter formation-use driver 40 is equipped with (1) a shift register 41, (2) signal input terminals 43, 44, and 45 to which signals for forming color filters of the color R, those for forming color filters of the color G, and those for forming color filters of the color B are supplied, respectively, and (3) sampling switches 42 for sampling the signals for forming the color filters. The signal input terminals 43, 44, and 45 are connected with every three source bus-lines 120, respectively, through the sampling switches 42.

In the case where the color filters of the color R are formed, an ON-voltage is sequentially applied to the gate electrodes of the pixel TFTs in the TFT array section 34. In the case where the pixel TFTs in the TFT array section 34 are arranged so that color filters of the same color are connected with a same bus-line, like in the stripe form arrangement, the ON-voltages may be simultaneously applied to the gate electrodes of the pixel TFTs. During this operation, the shift register 41 of the color filter formation-use driver 40 is made to operate, while a voltage of, for example, 5 V is applied to the signal input terminal 43 for the color R and a voltage of 0 V is applied to the other two signal input terminals 44 and 45. To form the color filters of the colors G and B, such operations are carried out sequentially. Thus, the electro-deposited color filters of the colors R, G, and B are formed.

The color filter formation-use driver 40 does not have to have a function of driving the LCD device, and, for example, may operate only at a low speed. Therefore, the formation of the color filters can be carried out by the use of a low-cost driver. As the color filter formation-use driver 40, it is preferable to use a driver having a high break-down resistance, in consideration of that it is attached to and removed from the substrate and is used for several times. In addition, the color filter formation-use driver 40 may be provided on a side opposite to the gate driver 32. The color filter formation-use driver 40 may be provided alone either on the source side or on the gate side, or may be provided on both the sides. A Driver for driving the bus-lines may be provided on an end side of the bus-lines which is opposite to an end side thereof where the color filter formation-use driver 40 is provided.

On the other hand, on a counter substrate (second substrate), at least counter electrodes made of ITO are formed. Thereafter, an alignment operation is carried out with respect to the TFT substrate and the counter substrate, and then, the two substrates are combined and liquid crystal is sealed into between the substrates. Thus, a liquid crystal panel is formed.

As described above, since the color filters are formed by electro-deposition, offsets of positions of the color filters with respect to the pixel electrodes by no means occur. Even in the case where the bus-lines becomes narrower like in a compact and fine liquid crystal panel, neighboring color filters can be separated by bus-lines since electro-deposited color filters can be thus formed in the same pattern as that for pixel electrodes 25. Therefore, deterioration of display quality due to offsets of the color filters with respect to apertures of the liquid crystal panel by no means occurs.

Furthermore, in the case where disconnection or operational errors of the TFTs happen in the TFT substrate, normal color filters are not formed on the pixel electrodes. Therefore, by forming the color filters and inspecting them, presence or absence of defects of the TFT substrate is made clear. Thus, the inspection of the color filters serves as an inspection process of the TFT substrate. If it is found that the TFT substrate has defects, operations of the subsequent processes are not applied to the TFT substrate. Thus, the judgement on presence or absence of defects is made earlier than that of the conventional inspection that is carried out after the assembling of the liquid crystal panel. As a result, losses in the manufacturing processes can be minimized.

Second Embodiment

Figure 4:
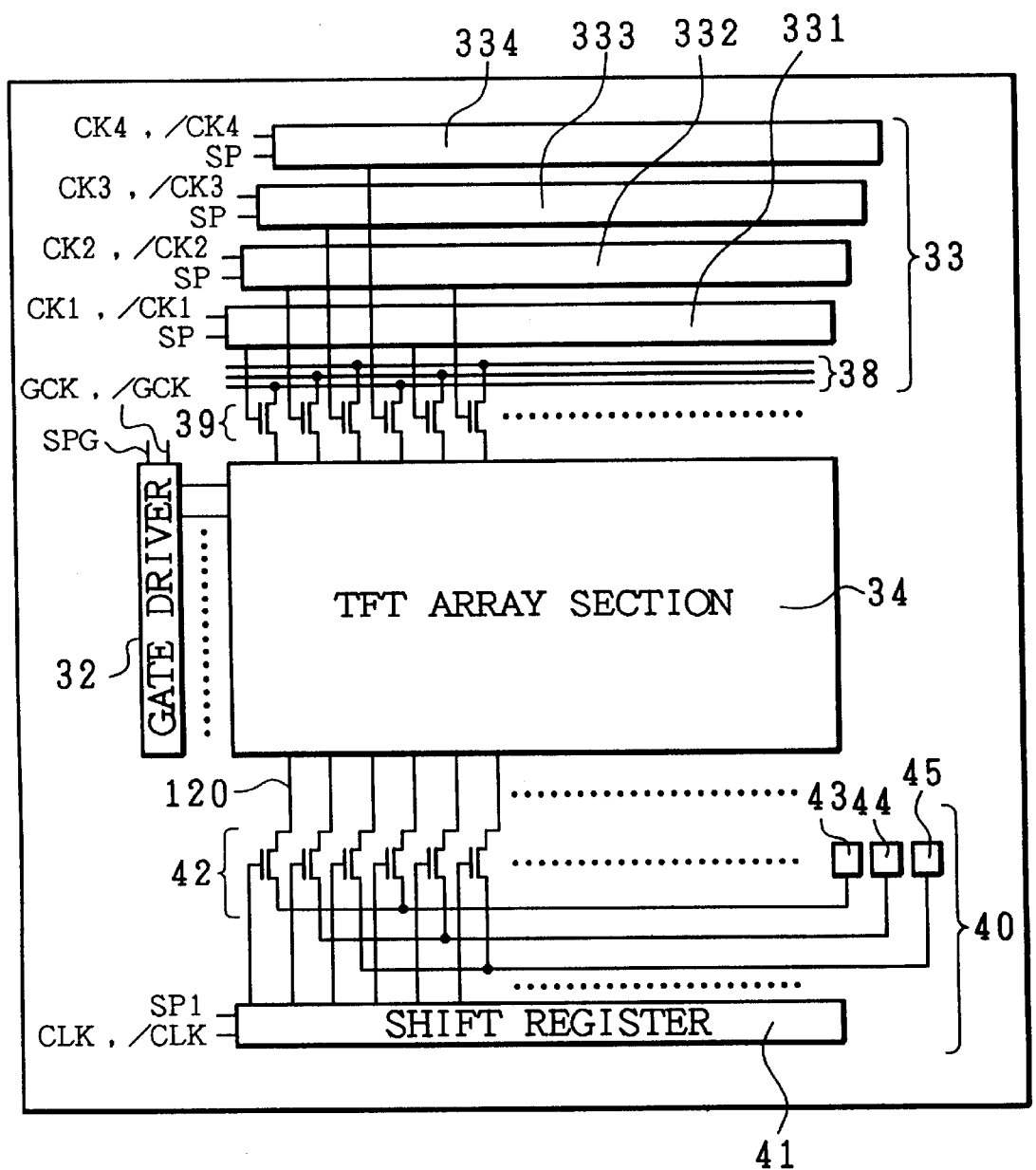
FIG. 4 is a view illustrating an arrangement of an LCD device in accordance with the second embodiment.
Figure 5:
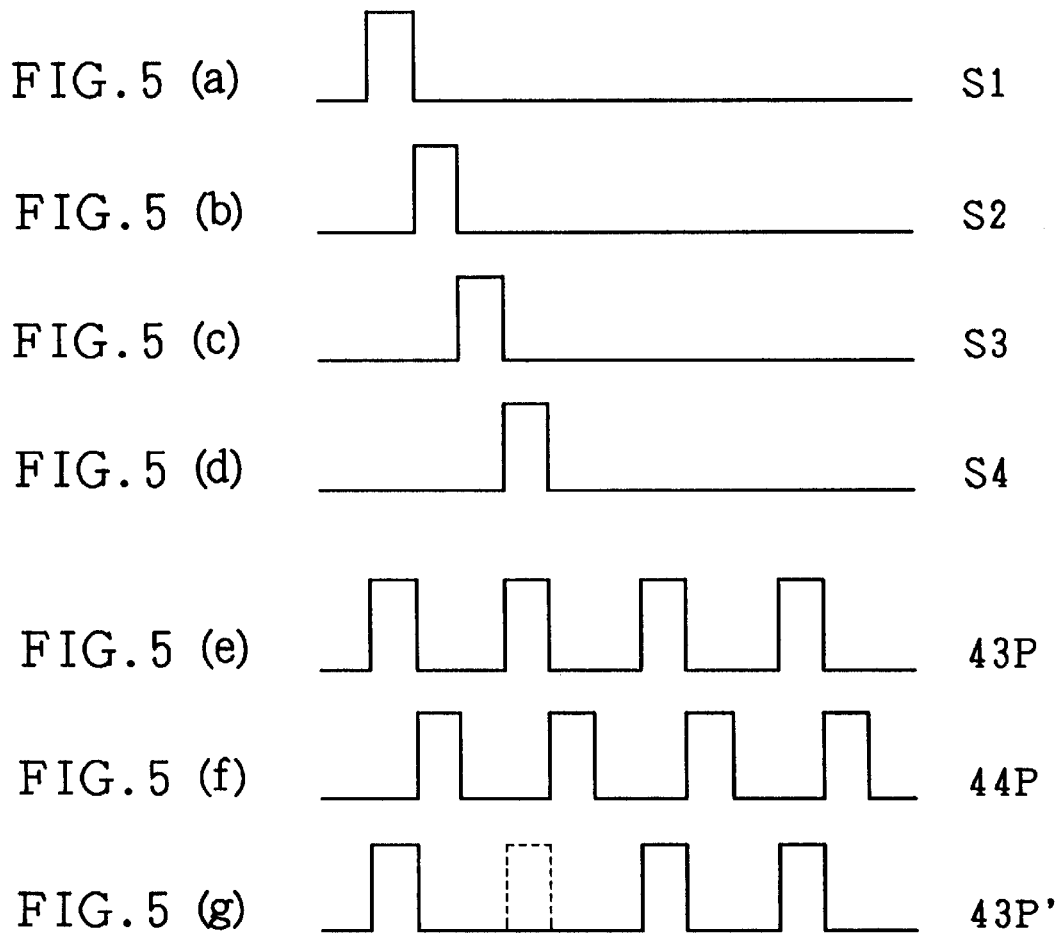
FIGS. 5(a) through 5(g) are waveform charts of signals for inspection of defects of the LCD device.
Figure 6:
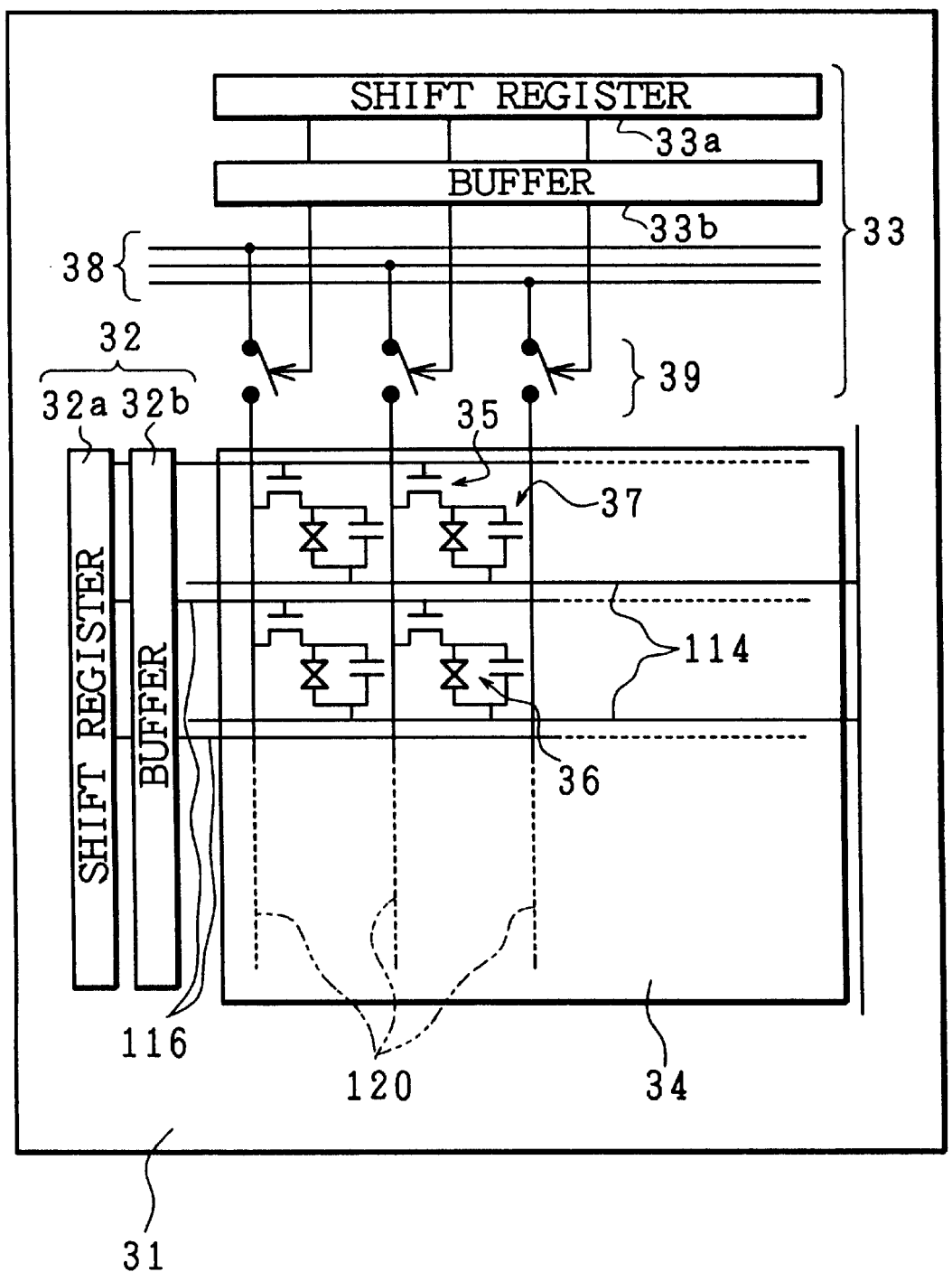
FIG. 6 is a view illustrating an arrangement of a conventional LCD device.
Figure 7:
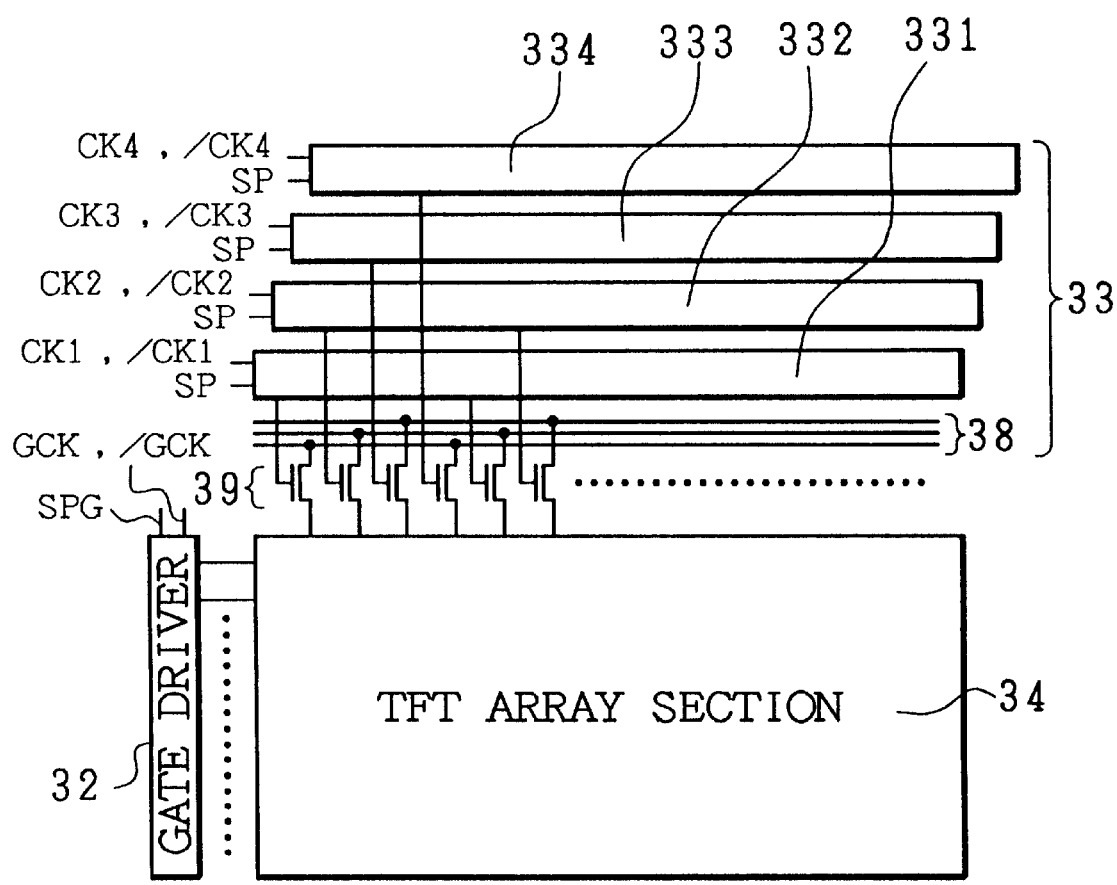
FIG. 7 is a view illustrating an arrangement of another conventional LCD device.

The following description will explain a second embodiment of the present invention, while referring to FIGS. 4 and 5. The members having the same structure (function) as those in the above-mentioned embodiment will be designated by the same reference numerals and their description will be omitted.

FIG. 4 illustrates a driver-incorporated LCD device wherein a color filter formation-use driver 40 is provided for forming color filters aligned in a stripe form. In the driver-incorporated LCD device, a monolithic driver and a color filter formation-use driver 40 have been already completed by the time when an operation for forming pixel electrodes is carried out, and color filters are formed by the use of the color filter formation-use driver 40. Like in the conventional arrangements, four series of shift registers 331 through 334 formed above a TFT array section 34 constitute a source driver 33, while the color filter formation-use driver 40 is formed below the TFT array section 34.

The color filter formation-use driver 40 is equipped with (1) one series of a shift register 41, (2) signal input terminals 43, 44, and 45 to which signals for forming color filters of the color R, those for forming color filters of the color G, and those for forming color filters of the color B are supplied, respectively, and (3) sampling switches 42 for sampling the signals for forming the color filters. The signal input terminals 43, 44, and 45 are connected with every three source bus-lines 120, respectively, through the sampling switches 42.

In the case where the color filters of the color R are formed, an ON-voltage is sequentially applied to gate electrodes of pixel TFTs in the TFT array section 34. In the case where the pixel TFTs in the TFT array section 34 are arranged so that color filters of the same color are connected with a same bus-line like in the stripe form arrangement, the ON-voltages may be simultaneously applied to the gate electrodes of the pixel TFTs. During this operation, the shift register 41 is caused to operate, while a voltage of, for example, 5 V is applied to the signal input terminal 43 for the color R and a voltage of 0 V is applied to the other two signal input terminals 44 and 45. Likewise, to form the color filters of the colors G and B, such operations are carried out sequentially. Thus, the electro-deposited color filters of the colors R, G, and B are formed.

Thus, the formation of color filters does not require a high-speed operation of a shift register for driving the LCD device and its low-speed operation is satisfactory. Therefore, a plurality series of shift registers are not needed for forming color filters, but only one series of a shift register is needed. Therefore, since it is required to cause the shift register to operate, only two clock signals, that is, a clock signal CLK and an inverted clock signal /CLK are to be used. Thus, by providing the color filter formation-use driving circuit 40, a drastic reduction of the number of input signals can be achieved.

It is also possible to inspect the source driver and source bus-lines by the use of the color filter formation-use driver

40. An example method for such inspection will be explained below, with reference to FIGS. 4 and 5.

By causing the source driver 33 to operate, a signal S1 (see FIG. 5(*a*)), a signal S2 (see FIG. 5(*b*)), a signal S3 (see FIG. 5(*c*)), and a signal S4 (see FIG. 5(*d*)) are sequentially sent to a source bus-line 120 which is the first from an end, a source bus-line 120 which is the second, a source bus-line 120 which is the third, and a source bus-line 120 which is the fourth, respectively. At the same time, the shift register 41 of the color filter formation-use driver 40 is caused to operate in an interlocked manner so that signals are supplied to the gate electrodes of the sampling switches 42 in synchronization with the output timings of the signals S1 through S4.

Herein, in the case where the source driver 33 and the source bus-lines 120 have no defects, a signal having such a waveform as that of a signal 43P (see FIG. 5(*e*)) is supplied to the signal input terminal 43, while a signal having such a waveform as that of a signal 44P (see FIG. 5(*f*)) is supplied to the signal input terminal 44.

On the other hand, for example, in the case where a pulse of the signal S4 is not supplied from the source driver 33, a resultant signal 43P, lacking the second pulse and becoming a signal having a waveform such as that of a signal 43P' (see FIG. 5(*g*)), is supplied to the signal input terminal 43. Therefore, a portion which has a defect can be identified. Moreover, by checking states of the color filters formed on the pixel electrodes, it is judged whether the bus-line or the source driver has the defect.

Note that a case where the color filter formation-use driver 40 is provided with respect to the source bus-lines is explained in the present embodiment, but the present invention is not limited to the arrangement of this embodiment. The color filter formation driver 40 may be provided so as to be associated with the gate bus-lines, or it may be provided so as to be associated with both the source bus-lines and the gate bus-lines.

As has been shown by the first and second embodiments, the LCD device of the present invention is characterized in comprising (1) a first substrate having gate bus-lines, source bus-lines, a switching element array, pixel electrodes, and a source driver and a gate driver for driving the switching element array, (2) a second substrate having a counter electrode, and (3) liquid crystal provided between the first and second substrates, wherein a color filter formation-use driver is provided with respect to at least either the gate bus-lines or the source bus-lines, so that color filters are formed on the pixel electrodes by the use of the color filter formation-use driver.

With the aforementioned arrangement, no high-cost driver IC is required for driving the LCD device of the present invention, and the color filter formation-use driver needs less input signal terminals. Therefore, the formation of the color filters can be carried out in a simple and easy manner.

Besides, it is preferable that the color filter formation-use driver is provided at least with respect to the source bus-lines. By doing so, there is no need to use a source driver IC having a complicated circuit system which is usually required to drive the LCD device. Therefore, complicated operations for inputting signals are not necessary, and the number of input signal terminals can be reduced, thereby allowing the formation of the color filters on the pixel electrodes in a simple and easy manner.

In addition, the color filter formation-use driver may be provided with respect to both the source bus-lines and the gate bus-lines. By doing so, there is no need to use a source driver IC and a gate driver IC having complicated circuit systems which are usually required to drive the LCD device. Therefore, complicated operations for inputting signals are not necessary, and the number of input signal terminals can be reduced, thereby allowing the formation of the color filters to be carried out by the use of the color filter formation-use driver alone in a simple and easy manner.

It is also preferable that the color filter formation-use driver, the source driver, and the gate driver are formed on the same substrate as the switching elements are formed. By doing so, the drivers may be composed of peripheral circuits formed on peripheral parts of the substrate, and signals may be supplied to terminal sections formed on the substrate. Therefore, the formation of the color filters can be carried out in a further simpler and easier manner. Here, in the case where a plurality series of shift registers are provided in the source driver, the number of the input signal lines can be reduced by providing the color filter formation-use driver. Besides, since a process for connecting the color filter formation-use driver with the substrate can be omitted, the manufacturing processes are simplified while errors which tend to occur on connecting the color filter formation-use driver can be eliminated. Furthermore, since the color filter formation-use driver is provided directly on the substrate, the number of input signal terminals of the substrate for signals supplied from outside can be reduced. Moreover, during a subsequent operation for forming the color filters, a required space is smaller and the placing of the substrate is easier, as compared with the case where the color filter formation-use driver is provided outside the substrate. Thus, working efficiency is improved.

The following is a method for manufacturing an LCD device of the present invention, which has (1) a first substrate having gate bus-lines, source bus-lines, a switching element array, pixel electrodes, and a source driver and a gate driver for driving the switching element array, (2) a second substrate having a counter electrode, and (3) liquid crystal between the first and second substrates, wherein a color filter formation-use driver is provided with respect to at least either the gate bus-lines or the source bus-lines, so that color filters are formed on the pixel electrodes by the use of the color filter formation-use driver. The method is characterized in comprising the steps of (a) forming the switching element array, (b) providing the color filter formation-use driver on the first substrate, (c) forming the color filters on the pixel electrodes by inputting signals to the color filter formation-use driver, and (d) removing the color filter formation-use driver after the formation of the color filters.

By the aforementioned method, the color filters can be formed in a simple and easy manner, since a high-cost driver IC having a complicated circuit system to drive the LCD device is not required and necessary input signal terminals are less. Besides, since the color filter formation-use driver is removed from the substrate after color filters are formed on the pixel electrodes, the color filter formation-use driver can be repeatedly used. Furthermore, never occurs such disadvantage in that a driver connected with the substrate is damaged by static electricity through a subsequent rubbing process for aligning the liquid crystal molecules.

Another method for manufacturing the LCD device of the present invention is characterized in comprising the steps of (a) forming the switching element array, (b) forming the source driver, the gate driver, and the color filter formation-use driver on the first substrate through a same process, and (c) forming the color filters on the pixel electrodes by inputting signals to the color filter formation-use driver.

By the aforementioned method, there is no need to provide on the substrate a driver IC for forming the color filters, and the formation of the color filters can be carried out in a simpler and easier manner. Moreover, since the process for connecting the color filter formation-use driver with the substrate is omitted, the manufacturing processes are simplified, while errors which tend to occur on connecting the color filter formation-use driver can be eliminated. Furthermore, no color filter formation-use driver IC attached outside the substrate is required, the manufacturing costs become the less for the omission of such driver IC.

A method of the present invention for inspecting a liquid crystal display device, which has (1) a first substrate having gate bus-lines, source bus-lines, a switching element array, pixel electrodes, and a source driver and a gate driver for driving the switching element array, (2) a second substrate having a counter electrode, and (3) liquid crystal between the first and second substrates, is characterized in comprising the steps of (a) providing the gate driver and the source driver on an end side of the gate bus-lines and on an end side of the source bus-lines, respectively, and providing a color filter formation-use driver either on the other end side of the gate bus-lines or on the other end side of the source bus-lines, and (b) inspecting whether or not the gate driver or the source driver have any defects, by the use of the color filter formation-use driver.

According to the aforementioned inspection method, a specific inspection device for inspecting defects of the drivers is not needed but substituted by the color filter formation-use driver. Therefore, the inspection of defects can be easily and smoothly carried out. In the case where either the source driver or the gate driver has defects, operations of subsequent processes are not applied to the substrate, reducing wasteful application of processing operations. As to some types of defects, they can be repaired so that the substrate satisfies requirements in quality.

Furthermore, since the color filters formed by the color filter formation-use driver are electro-deposited types, the formation of the color filters on the pixel electrodes can be carried out with precision through a very simple process, without a costly process of photolithography. Besides, pixel defects can be easily detected.

Therefore, simplification of manufacturing processes, an increase in a throughput of the products, and improvement of the yield can be achieved.

Third Embodiment

The following description will explain a third embodiment of the present invention while referring to FIGS. 8 through 11. The members having the same structure (function) as those in the above-mentioned embodiment will be designated by the same reference numerals and their description will be omitted.

Figure 8:
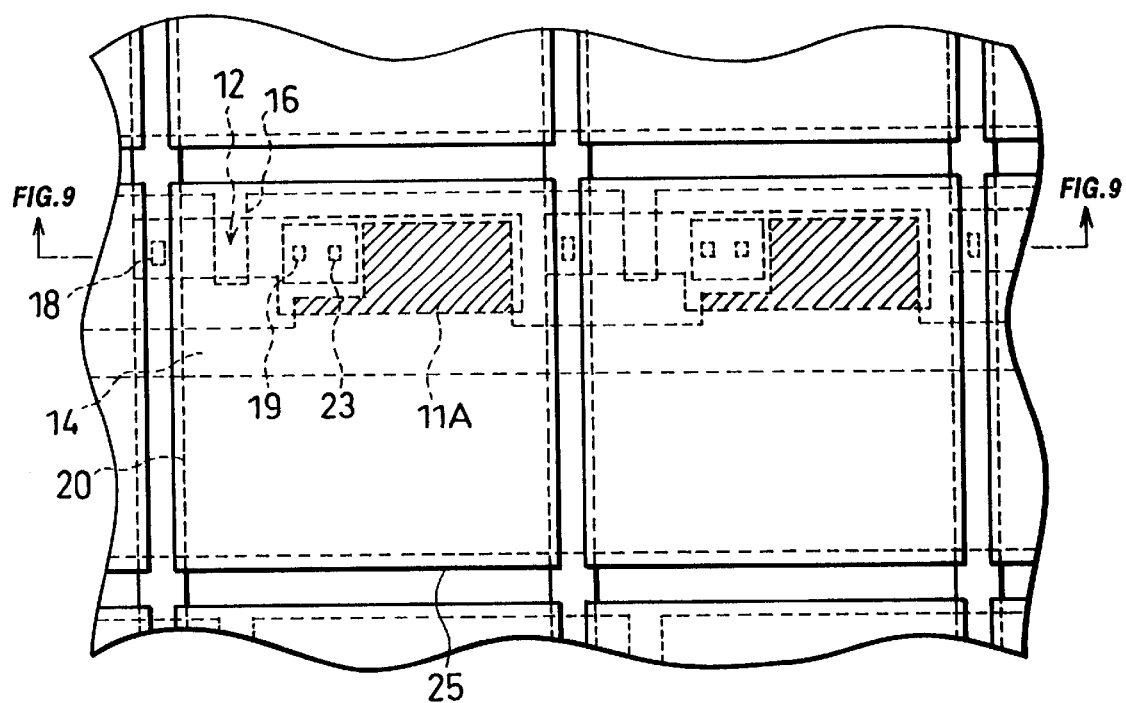
FIG. 8 is a plan view illustrating two pixel portions of an LCD device in accordance with the third embodiment of the present invention.
Figure 9:
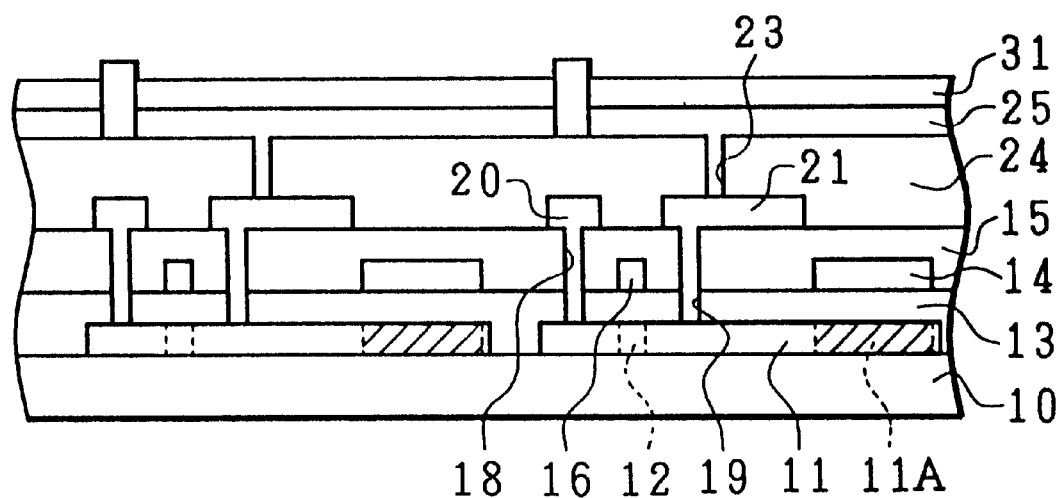
FIG. 9 is a cross-sectional view of the portion along a C—C arrow line in FIG. 8.

FIG. 8 is a layout of two pixels in accordance with the present embodiment, and FIG. 9 illustrates a cross section of the two pixels of FIG. 8 along an arrow line C—C. The following description will explain a TFT manufacturing method in accordance with the present embodiment, while referring to FIGS. 8 and 9.

As illustrated in FIG. 9, a polycrystalline silicon thin film 11 serving as an active layer is formed to a thickness of 40 nm to 80 nm on an insulating substrate 10. Subsequently, by the sputtering method or the CVD method, a gate insulating film 13 is formed with $SiO_2$ or $SiN_x$ to a thickness of 80 nm. Subsequently, phosphorus ions are implanted to a hatched additional capacity region 11A so that the region has a low resistance. This additional capacity region 11A constitutes an additional capacity lower electrode. Thereafter, an additional capacity upper electrode 14 and a gate electrode 16 are formed with Al or polycrystalline silicon.

Then, to determine a type of conductivity of the TFT thus formed, phosphorus ions are implanted thereto at a rate of $1 \times 10^{15}$ ($cm^{-2}$) from above the gate electrode 16 with the gate electrode 16 used as a mask, so that a non-doped channel section 12 are formed in the active layer below the gate electrode 16 and the other region than the channel section 12 becomes a high-density impurity region. In the active layer of the TFT, a low-density impurity region or a non-doped region may be provided in the vicinity of the channel section 12, so that the TFT has small leakage of electricity when it is in the OFF state.

After a first inter-layer insulating film 15 is formed all over the TFT, a contact hole 18 and a contact hole 19 are formed. Then, a source bus-line 20 and a drain electrode 21 are formed with a metal having a low resistance, such as Al. Subsequently, a second inter-layer insulating film 24 is formed. For example, a transparent, photosensitive organic film may be formed by the spin coating method, so as to serve as the second inter-layer insulating film 24. In the present embodiment, since this liquid crystal panel is used as a transparent-type LCD device, not a colored organic material but a transparent acrylic resin is used as a material for the second inter-layer insulating film 24.

Thereafter, a contact hole 23 is formed in the second inter-layer insulating film 24 above the drain electrode 21, and a pixel electrode 25 is formed over the contact hole 23 with a transparent conductive film material such as ITO. The pixel electrodes 25 are formed at least on apertures of the liquid crystal panel.

Subsequently, by utilizing the pixel electrodes 25 formed in this way, electro-deposited color filters are formed.

Figure 10:
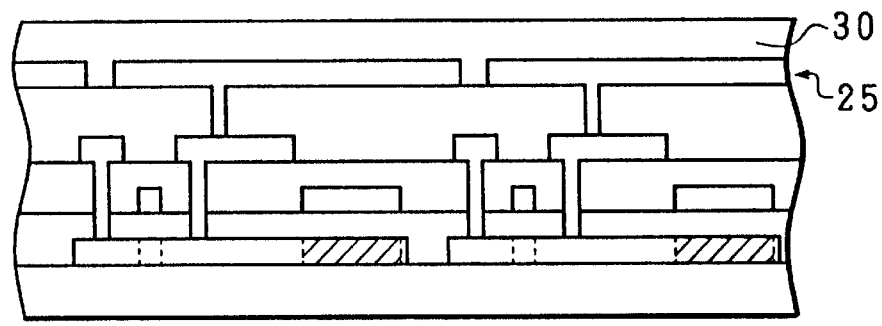
FIGS. 10(a) through 10(c) are cross-sectional views illustrating manufacturing processes of the LCD device.
Figure 10:
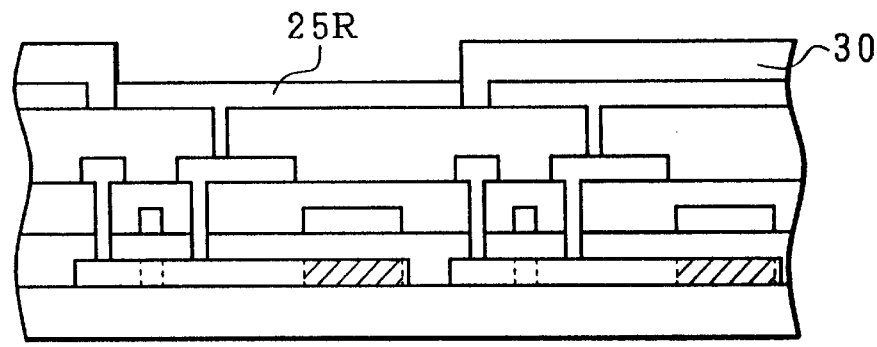
Figure 10:
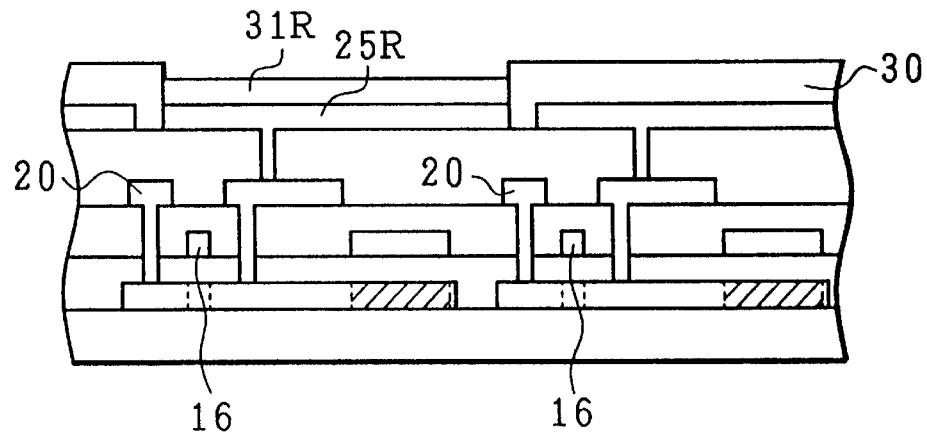
Figure 11:
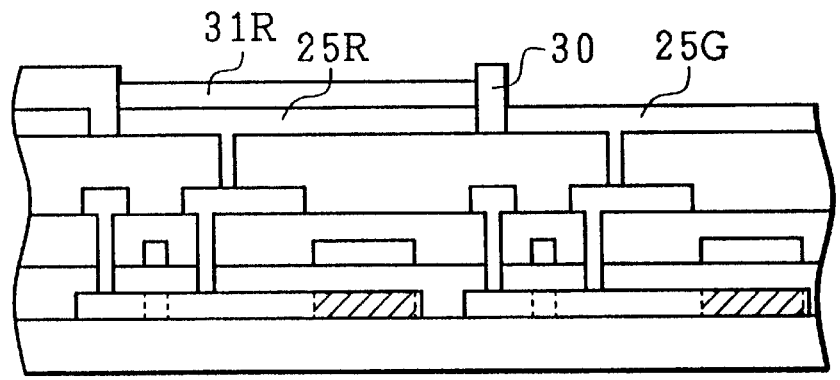
FIGS. 11(a) through 11(c) are cross-sectional views illustrating manufacturing processes of the LCD device following the processes shown in FIGS. 10(a) through 10(c).
Figure 11:
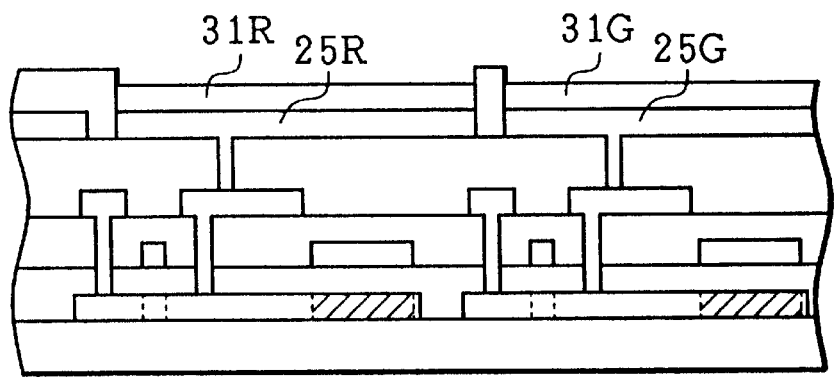
Figure 11:
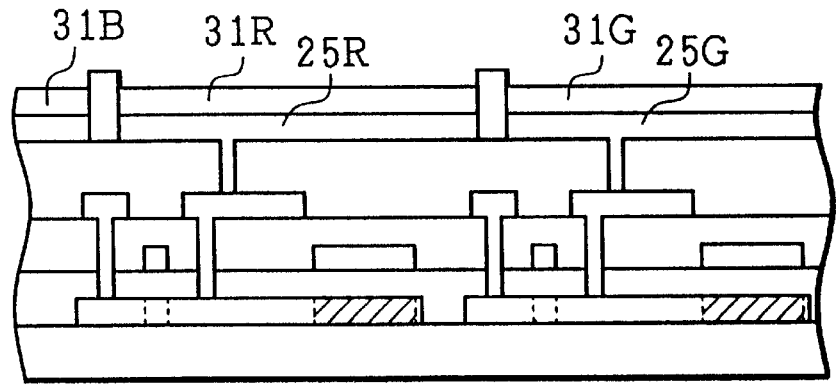

A method for forming electro-deposited color filters after formation of the pixel electrodes, in accordance with the present embodiment, is explained as follows, with reference to FIGS. 10 through 11. FIGS. 10 through 11 are cross-sectional views of the two pixels of FIG. 8 along the arrow line C—C, which illustrate a manufacturing method of an LCD device. These figures constitute a process chart showing a sequence of manufacturing steps.

As shown in FIG. 10(a), an insulating film 30 is formed over the pixel electrodes 25, and then, as shown in FIG. 10(b), portions of the insulating film 30 just on pixel electrodes 25R corresponding to the R color are removed by etching.

Then, as illustrated in FIG. 10(c), the TFT substrate is soaked in an electro-deposition solution for the color R. Thereafter, all the gate electrodes 16 are turned on, while a signal is supplied to all the source bus-lines 20, so that electro-deposition for forming color filters is carried out with respect to all the pixel electrodes 25R.

A method for supplying the signals is as follows. Voltages are applied to gate-use short rings that are formed by short-circuiting gate bus-lines outside a display section for the purpose of avoiding static electricity, as well as to source-use short rings that are formed by short-circuiting source bus-lines 20 for the same purpose. For example, a voltage of 15 V is applied to the gate bus-lines, while a voltage of 5 V is applied to the source bus-lines 20. It is preferable that the gate-use short rings and the source-use short rings remain short-circuited through processes before and after the formation of the color filters.

Thus, since the insulating film 30 is removed only from on the pixel electrodes on which the electro-deposited color filters are to be formed, it is possible to carry out the formation of the color filters by the electro-deposition with all the TFTs turned on. Therefore, there is no need to cause a driver to supply selected pixel electrodes with signals for electro-deposition.

Furthermore, in the case where the electro-deposited color filters are formed in a stripe form, the following method may be applied. Pixel electrodes corresponding to the color R are short-circuited each other, and so are those corresponding to the color G and those corresponding to the color B, respectively. Then, a voltage is applied to the pixel electrodes for the color R (hereinafter referred to as R pixel electrodes), then, to the color pixel electrodes for the color G (hereinafter referred to as G pixel electrodes), and then, to the pixel electrodes for the color B (hereinafter referred to as B pixel electrodes), so that filter of respective colors are formed. In this case, three short rings and three signal input terminals through which a signal for color filter formation is supplied are required. In the present embodiment, however, only one input terminal for color filter formation is required. Thus, electro-deposited color filters (first color filters) 31R of the color R are formed. Note that a baking operation is applied to the electro-deposited color filters 31R thus formed so that the color filters 31R lose conductivity.

Thereafter, as illustrated in FIG. 11(a), portions of the insulating film 30 just on the G pixel electrodes 25G are removed by etching. Then, like in the case of the color R, as illustrated in FIG. 11(b), the TFT substrate is soaked in an electro-deposition solution for the color G, and electro-deposited color filters (second color filters) 31G of the G color are formed on the pixel electrodes 25G. Here, a voltage of 15 V is applied to the gate bus-lines, whereas a voltage of 5 V is applied to the source bus-lines. Note that since the electro-deposited color filters 31R of the color R that have been formed through the previous process have already lost conductivity by the baking operation, it by no means occurs that electro-deposited color filters 31G are formed over the electro-deposited color filters 31R. Thereafter, the baking operation is applied to the electro-deposited color filters 31G thus formed so that the color filters 31G lose conductivity.

Subsequently, as illustrated in FIG. 11(c), like in the cases of the colors R and G, electro-deposited color filters (third color filters) 31B of the color B are formed, to complete the electro-deposited color filters of the three colors. Note that since the electro-deposited color filters 31R and 31G that have been formed through the previous process have already lost conductivity by the baking operation, it by no means occurs that electro-deposited color filters 31B of the color B are formed over the electro-deposited color filters 31R and 31G. Thereafter, the baking operation is applied to the electro-deposited color filters 31B thus formed so that the color filters 31B lose conductivity.

On the other hand, on the counter substrate, at least counter electrodes made of ITO are formed. Then, after an alignment operation is applied to the TFT substrate and the counter substrate, the TFT substrate and the counter substrate are combined, and liquid crystal is sealed therebetween, whereby a liquid crystal panel is formed.

Fourth Embodiment

Figure 12:
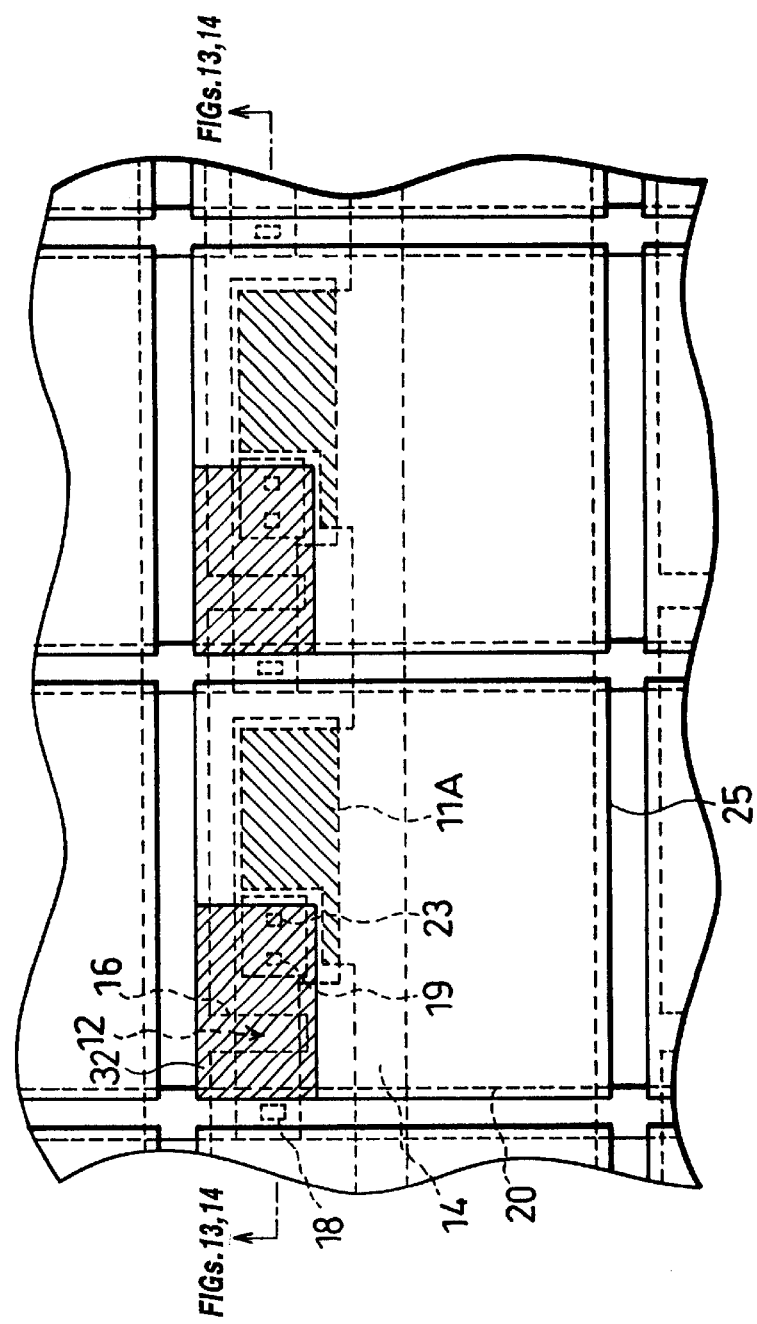
FIG. 12 is a plan view illustrating two pixel portion of an LCD device in accordance with the fourth embodiment of the present invention.

FIG. 12 is a layout of two pixels in accordance with a fourth embodiment of the present invention. In the present embodiment, the arrangement is the same as that shown in FIG. 8, except that a light shielding films 32 are formed over TFTs, as shown in FIG. 12.

Figure 13:
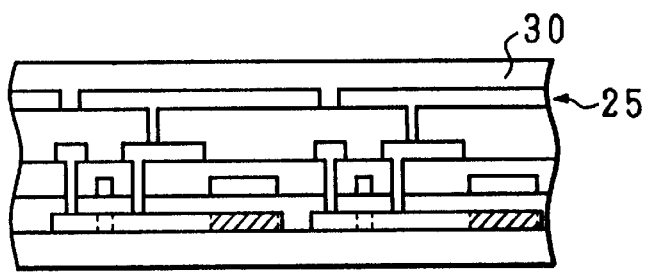
FIGS. 13(a) through 13(e) are cross-sectional views illustrating manufacturing processes of the LCD device.
Figure 13:
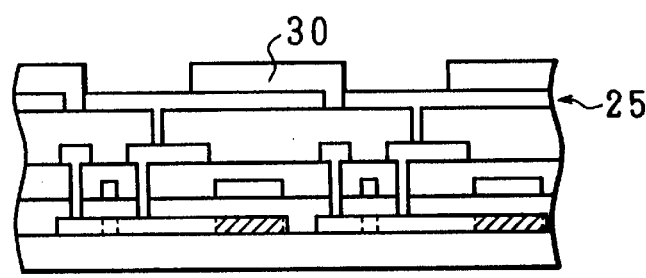
Figure 13:
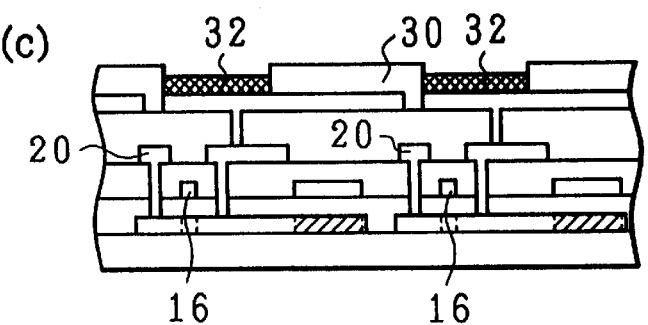
Figure 13:
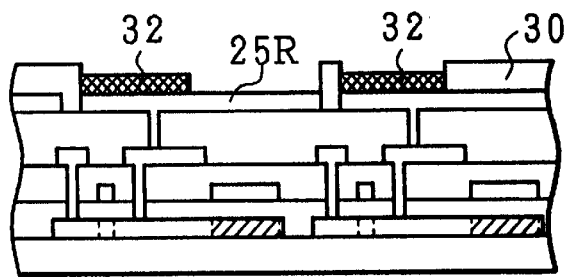
Figure 13:
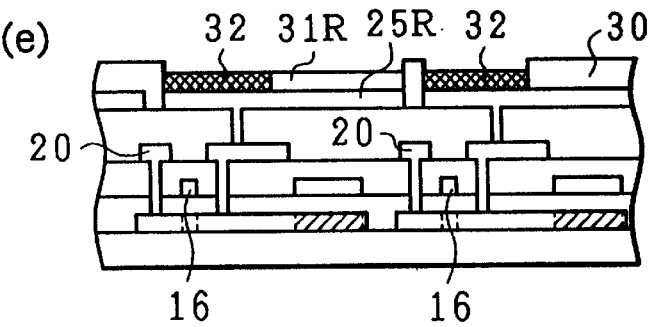
Figure 14:
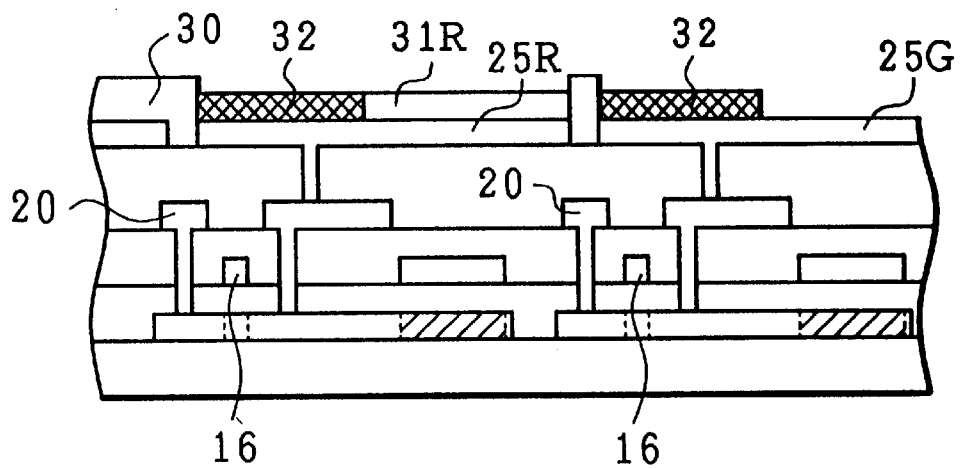
FIGS. 14(a) through 14(c) are cross-sectional views illustrating manufacturing processes of the LCD device following the processes shown in FIGS. 13(a) through 13(e).
Figure 14:
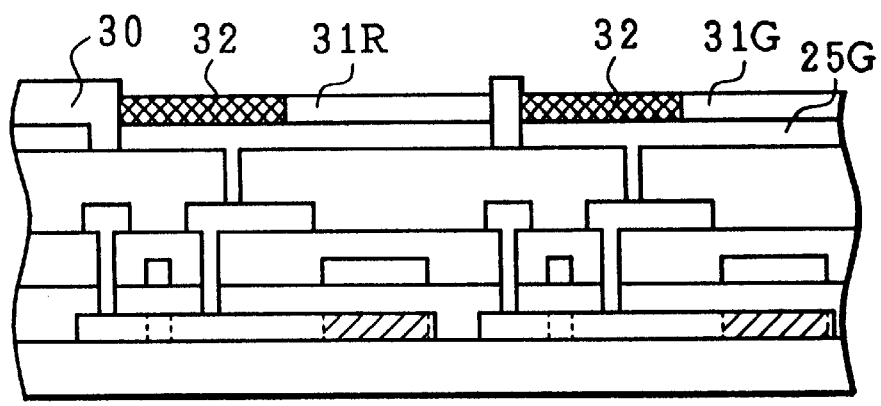
Figure 14:
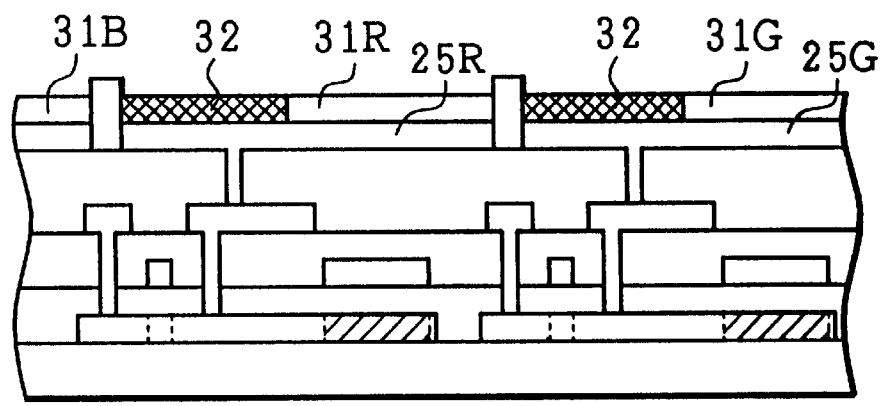

FIGS. 13 through 14 are cross-sectional views of the two pixels of FIG. 12 along the arrow line B—B, which illustrate a manufacturing method of an LCD device. FIGS. 13 through 14 constitute a process chart showing a sequence of manufacturing steps.

The fourth embodiment is explained below, with reference to FIGS. 13 through 14. In the present embodiment, the light shielding films for blocking light directed toward the TFTs are formed by utilizing pixel electrodes. In the case where the counter substrate is arranged so as to have light shielding films, it is necessary to form the light shielding films to a bigger size in consideration to a possible offset with respect to the TFT substrate which may occur when they are combined, and as a result a numerical aperture is decreased due to this. However, by providing the light shielding film over the TFT substrate, such a drawback can be avoided.

As to the manufacturing process forming the pixels shown in FIGS. 13 through 14, the process till the step of forming pixel electrodes 25 and the subsequent step of forming an insulating film 30 is the same as that in the third embodiment (see FIG. 13(a)).

Subsequently, portions of the insulating film 30 corresponding to regions where light shielding films are to be formed later over the pixel electrodes 25 in the TFTs are removed by etching, as illustrated in FIG. 13(b).

Then, as illustrated in FIG. 13(c), the TFT substrate is soaked in an electro-deposition solution for black color, and all the gate electrodes 16 are turned on, while a signal is supplied to all the source bus-lines 20. By doing so, in the regions where the insulating film 30 has been removed by etching, electro-deposited color filters of the black color are formed so as to serve as light shielding films 32. For example, a voltage of 15 V is applied to the gate bus-lines, whereas a voltage of 5 V is applied to the source bus-lines 20.

Note that a resin in which a black pigment is dispersed may be used as a material for the black electro-deposited color filters as the light shielding films 32. For example, as such resin, an anion-type electro-deposition resin of a polyester/melanin resin group, or the same in which a black pigment is dispersed, can be used. But the material should not be limited to such things, but cation-type resins, other color pigments (red, blue, green, etc.), or pigments whose particles have positively or negatively charged surfaces, may be used. The baking operation is applied to the light shielding films 32 so that they lose conductivity.

Subsequently, as illustrated in FIG. 13(d), portions of the insulating film 30 on the pixel electrodes 25R corresponding to the color R are removed by etching.

Then, as illustrated in FIG. 13(e), like in the first embodiment, the TFT substrate is soaked in the electro-deposition solution for the color R, and all the gate electrodes 16 are turned on while a signal for electro-deposition is supplied to all the source bus-lines 20, whereby electro-deposited color filters 31R of the color R are formed. Note that since the black electro-deposited color filters that have been formed as the light shielding films 32 through the previous process have lost conductivity due to the baking operation, it by no means occurs that the electro-deposited color filters 31R are formed on the black electro-deposited color filters. Then, the baking operation is applied to the electro-deposited color filters 31R so that they lose conductivity.

Subsequently, as illustrated in FIG. 14(a), portions of the insulating film 30 on the pixel electrodes 25G corresponding to the color G are removed by etching.

Then, as illustrated in FIG. 14(b), like in the case of the color R, the TFT substrate is soaked in the electro-deposition solution for the color G, and all the gate electrodes 16 are turned on while a signal for electro-deposition is supplied to all the source bus-lines 20, whereby electro-deposited color filters 31G of the color G are formed in the same manner as in the first embodiment. Note that since the electro-deposited color filters 31R that have been formed through the previous process have already lost conductivity due to the baking operation, it by no means occurs that the electro-deposited color filters 31G are formed on the electro-deposited color filters 31R. The baking operation is applied to the electro-deposited color filters 31G so that they lose conductivity.

Finally, as illustrated in FIG. 14(c), electro-deposited color filters 31B of the color B are formed in the same manner as in the cases of the colors R and G. Thus, the color filters of the colors R, G, and B are completed. Note that since the electro-deposited color filters 31R and 31G that have been formed in the previous process have already lost conductivity due to the baking operation, it by no means occurs that the electro-deposited color filters 31B are formed on the electro-deposited color filters 31R and 31G. Then, the baking operation is applied to the electro-deposited color filters 31B so that they lose conductivity.

On the other hand, on the counter substrate, at least counter electrodes made of ITO are formed. Then, after an alignment operation is applied to the TFT substrate and the counter substrate, the TFT substrate and the counter substrate are combined, and liquid crystal is sealed therebetween, whereby a liquid crystal panel is formed.

As has been shown by the third and fourth embodiments, the LCD device manufacturing method of the present invention, for manufacturing an LCD device which has (1) a first substrate equipped with gate bus-lines, source bus-lines, a switching element array, and pixel electrodes and color filters formed so as to correspond to switching elements of the switching element array, (2) a second substrate having a counter electrode, and (3) liquid crystal provided between the first and second substrates, is characterized in comprising the steps of (a) forming an insulating film over the pixel electrodes after the pixel electrodes are formed, (b) forming first contact holes in the insulating film, and forming first color filters in apertures of the first contact holes by utilizing the pixel electrodes, (c) forming second contact holes in the insulating film, and forming second color filters in apertures of the second contact holes by utilizing the pixel electrodes, and (d) forming third contact holes in the insulating film, and forming third color filters in apertures of the third contact holes by utilizing the pixel electrodes.

According to the aforementioned method, there should be provided only one input terminal for forming the color filters, and the formation of the color filters of the colors R, G, and B can be carried out with all the TFTs turned on. Therefore, there is no need to switch input terminals for forming the second-color or third-color filters.

Additionally, it is preferable that the method further comprises the step of forming shielding films by utilizing the pixel electrodes. By doing so, there is no need to form a light shielding film on the counter substrate. Besides, a costly process by photolithography is not required, and the formation of the light shielding films can be carried out in a easy and simple manner.

Furthermore, it is preferable that the step of forming the light shielding film is precedent to the step of forming the color filters. By doing so, when the light shielding films are formed with all the TFTs turned on, the light shielding films are not formed on TFTs having defects. Therefore, this step serves as a step of inspecting the TFTs, and in the case where there exist any defective TFTs, it is possible to repair them to make them acceptable ones.

An LCD device of the present invention, which has (1) a first substrate equipped with gate bus-lines, source bus-lines, a switching element array, and pixel electrodes and color filters formed so as to correspond to switching elements of the switching element array, (2) a second substrate having a counter electrode, and (3) liquid crystal provided between the first and second substrates, is characterized in comprising an insulating film provided so as to surround the pixel electrodes, wherein each of the color filters is provided on each pixel electrode surrounded by the insulating film.

In the case where color filters are formed without an insulating film, pixel electrodes and the resultant color filters have differences in height from other areas, causing an alignment film to have irregularities along borders between the different height portions, which further cause irregularities in alignment in a rubbing process. In the foregoing arrangement, however, such differences of the color filters in height from the other areas are decreased, and such a problem does not occur.

Besides, the LCD device of the present invention is preferably further equipped with light insulating films formed by utilizing the pixel electrodes. By doing so, there is no need to form light shielding films over the counter substrate so that the light shielding films correspond to the TFTs of the counter substrate so as to intercept light entering the TFTs. In the case where a black matrix and color filters are formed on the counter substrate, the black matrix should be formed to a bigger size to cope with assembling errors which may occur when the TFT substrate and the counter substrate are combined, and this causes a numerical aperture to decrease. However, with the aforementioned arrangement, this problem by no means occurs.

Furthermore, it is preferable that neighboring pixels are separated by the gate bus-lines and the source bus-lines. By doing so, the lines function as the light shielding films. Besides, the TFTs also have light shielding films thereabove. Therefore, a light shielding pattern is not required on the counter substrate. As a result, only a transparent conductive film is required on the counter substrate, and therefore, the process for manufacturing the counter substrate is simplified.

Fifth Embodiment

Since a TFT substrate used in a fifth embodiment is the same as that in the first embodiment shown in FIGS. 1 and 2, explanation on it is omitted in the following description.

Figure 15:
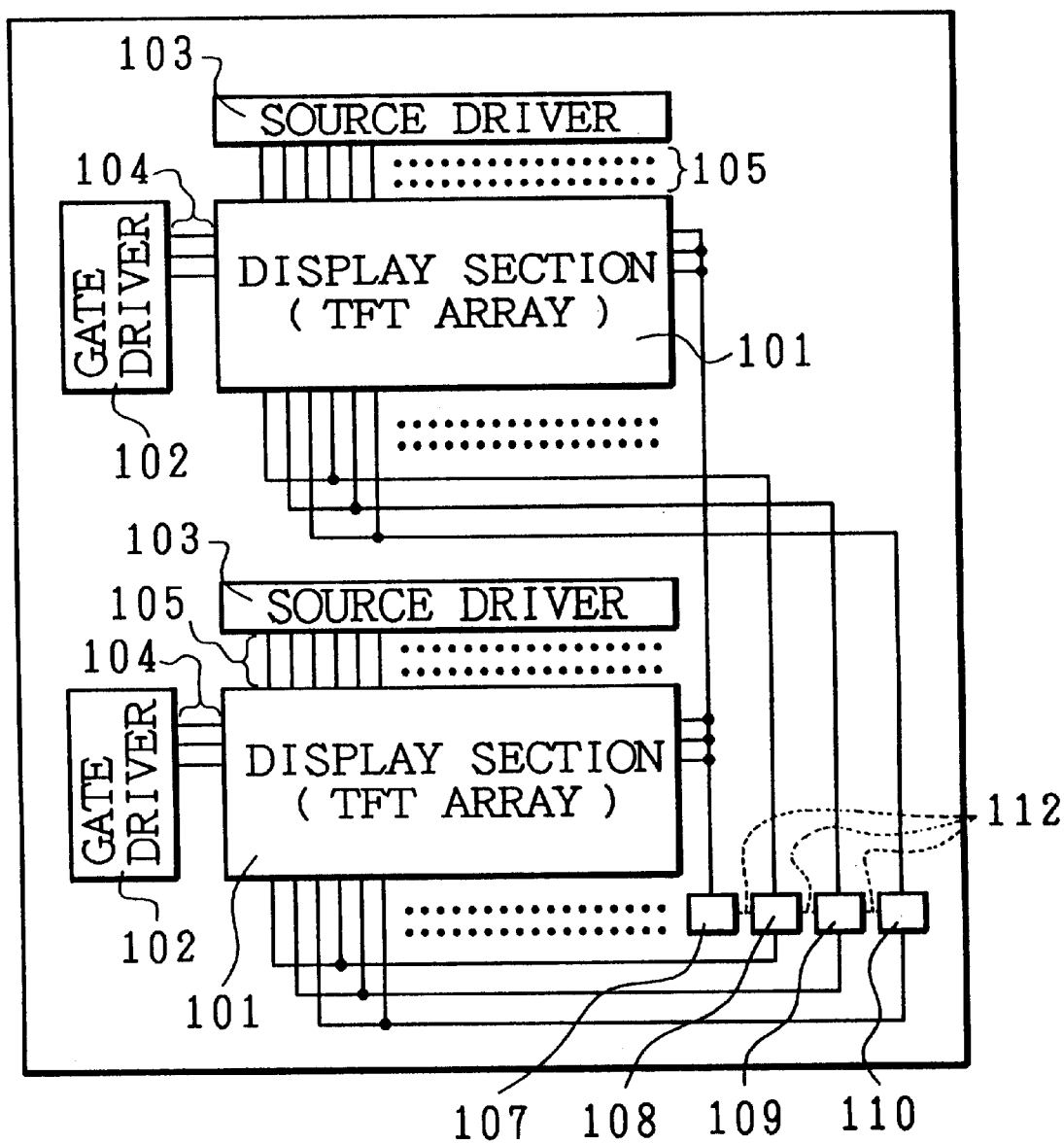
FIG. 15 is a view illustrating an arrangement of an LCD device in accordance with the fifth embodiment of the present invention.

The following description will explain a method for forming electro-deposited color filters in accordance with the present embodiment, while referring to FIG. 15. FIG. 15 is a view illustrating an arrangement wherein two TFT substrates are formed on one glass substrate. On each TFT substrate, there are provided a TFT array 101, a gate driver 102 connected with gate bus-lines 104, and a source driver 103 connected with source bus-lines 105. In the case of a driver-incorporated LCD device, the gate driver 102 and the source driver 103 are formed on the substrate simultaneously when the TFT array 101 is formed thereon, whereas in the other cases, a driver IC is installed on the substrate after the TFT substrate and a counter substrate are combined.

Note that in order to form the color filters, the gate bus-lines are short-circuited, with their ends on one side connected with each other, so as to be connected with a gate signal input terminal 107. Every other two source bus-lines 105 is short-circuited with each other, with their ends on one side connected, thereby forming three series of short rings. The short rings are connected with source signal input terminals 108, 109, and 110, respectively. The gate-use short rings of the two substrates are connected with each other through the gate signal input terminal 107, while the source-use short rings of one substrate and the corresponding source-use short rings of the other substrate are connected with each other, through the source signal input terminals 108, 109, and 110, respectively.

To avoid static electricity before the color filter formation, the four signal input terminals 107, 108, 109, and 110 are short-circuited. When color filters are formed, they are separated by short-circuit sections indicated by dot lines 112 in FIG. 15. Herein, as a method for separation, a method of cutting off the short-circuit sections by a laser is used.

Subsequently, the substrate is soaked in an electro-deposition solution for the color R, and voltages of 15 V 5 V, 0 V, and 0 V are applied to the gate signal input terminal 107, the source signal input terminal 108 for the color R, the source signal input terminal 109 for the color G, and the source signal input terminal 110 for the color B, respectively. Since the gate-use short rings of the two substrates are connected through the signal input terminal 107 while the corresponding source-use short rings of the two substrates are connected through the signal input terminals 108, 109, and 110, respectively, it is possible to simultaneously form color filters on a plurality of TFT substrates by applying voltages for electro-deposition color filter formation to the signal input terminals, 107, 108, 109, and 110.

Thus, electro-deposition color filters for the color R are formed on pixel electrodes corresponding to the color R in the two TFT substrates. Subsequently, through similar processes, electro-deposition color filters for the colors G and B are formed on the TFT substrates.

Thereafter, alignment films are provided and a rubbing operation is carried out through the subsequent process, for alignment of a liquid crystal material. In the case where the source-use short rings and the gate-use short rings are not connected during this process, TFTs in the display section are broken due to static electricity in this process, and the broken TFTs constitute dot-like defects.

Figure 16A:
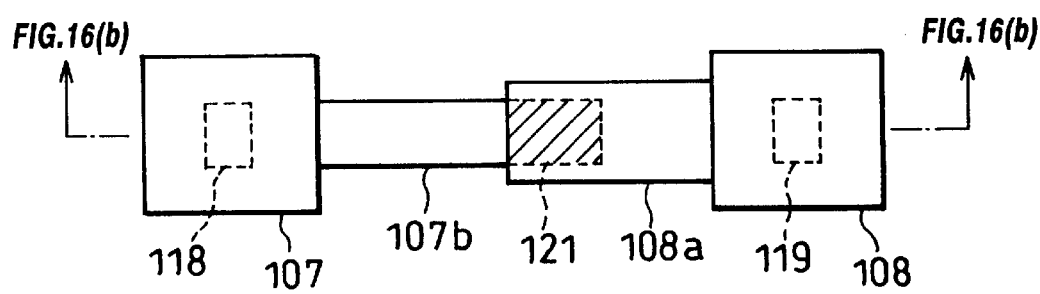
FIG. 16(a) is a plan view illustrating a short ring portion of the LCD device.
Figure 16B:
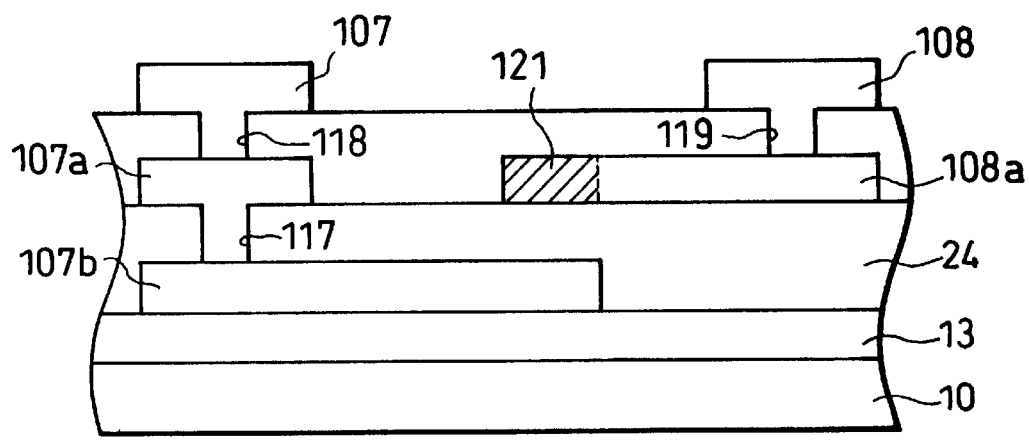
FIG. 16(b) is a cross-sectional view of the portion along an F—F arrow line in FIG. 16(a).

Therefore, the source-use short rings and the gate-use short rings are desirably again short-circuited after the color filter formation. To connect them, a method utilizing laser is applied in the present embodiment. Herein, to connect the short rings with the projection of the laser, short-circuiting-use patterns as shown in FIG. 16(*a*) are formed in advance. A cross section of the patterns along an F—F arrow line in FIG. 16(*a*) is shown in FIG. 16(*b*).

The short-circuiting-use patterns are provided between the gate signal input terminal 107 and the source signal input terminals 108, 109, and 110. For example, (1) a gate electrode material 107*b* which is electrically connected with the gate signal input terminal 107 through a gate electrode material 107*a*, and (2) a source electrode material 108*a* which is electrically connected with the source signal input terminal 108 are laminated with a second inter-layer insulating film 24 therebetween. Herein, the gate electrode material 107*b* and the source electrode material 108*b* are arranged so as to overlap in a hatched section 121. Note that 117, 118, and 119 in the figure are contact holes.

By projecting the laser on the hatched section 121 in the short-circuiting-use patterns, the gate electrode material 107*b* and the source electrode material 108*a* are short-circuited. Thus, the gate signal input terminal 107 and the source signal input terminal 108 are electrically connected, so that the gate-use short rings and the source-use short rings have the same potential. In the present embodiment, since the short-circuiting of the patterns is carried out by projecting the laser, no dust appears, unlike in the case where the short-circuiting of the patterns is carried out with the use of silver paste.

The patterns may be short-circuited by another method whereby metal wiring is formed by the laser CVD method so that the gate-use short rings and the source-use short rings are connected. In the present embodiment, since the source signal input terminals 108, 109, and 110 are formed in the vicinity of the gate signal input terminal 107, the input terminals are easily connected by applying the laser CVD method. In the case where the laser CVD method is applied, no dust appears, either.

Subsequently, the TFT substrates and the counter substrates are combined, and a liquid crystal material is sealed therebetween. Thus, liquid crystal cells are finished.

Finally, to cancel the short-circuiting between the neighboring short rings, the short rings are cut off at an edge of the glass substrate.

Thus, in the present embodiment, since the short rings are short-circuited with each other except during the color filter formation process, it is possible to prevent static electricity from breaking down the TFTs.

The first through fifth embodiments have been described by taking as an example the case where polycrystalline silicon is used as a material for the semiconductor layer and the TFTs whose configuration is the copalanar type are used, but the present invention is not limited to this arrangement. Another semiconductor material may be used for the semiconductor layer, while the TFTs may have another configuration such as the reverse staggered type. As a method for forming the color filters, the electro-deposition method is applied in the first through fifth embodiments, but another method, for example, the micell electrolytic method, may be used.

Sixth Embodiment

Figure 17:
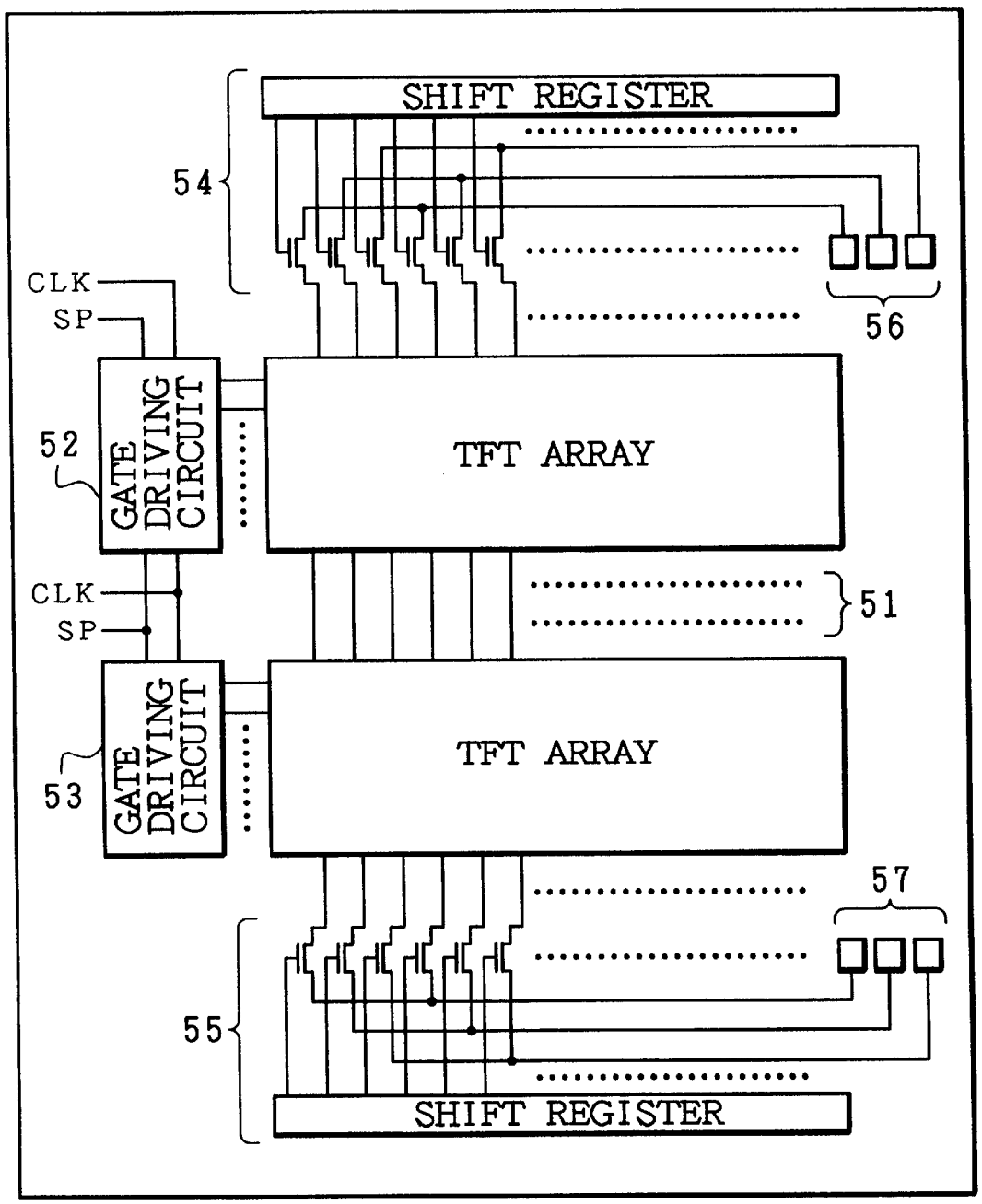
FIG. 17 is a view illustrating an arrangement of an LCD device in accordance with the sixth embodiment of the present invention.

In the fifth embodiment, color filters are formed simultaneously on a plurality of TFT substrates by utilizing short rings of the TFT substrates which are provided for common use of the substrates. And further, it is possible to simultaneously form color filters on TFT substrates which are vertically arranged, by short-circuiting source bus-lines of the TFT substrates at a short-circuiting section 51, as shown in FIG. 17. The following description will explain a color filter forming method in accordance with a sixth embodiment, while referring to FIG. 17.

In FIG. 17, two TFT substrates are vertically provided on one insulating substrate, and corresponding source bus-lines thereof are short-circuited at the short-circuiting section 51, respectively. When the color filters are formed, gate driving circuits 52 and 53 provided with respect to the TFT arrays, respectively, are connected with gate bus-lines. In addition, source driving circuits 54 and 55 are installed on the TFT substrates, respectively. The gate driving circuits 52 and 53 and the source driving circuits 54 and 55 can be simultaneously formed when the TFT arrays are formed, by using elements with a high mobility. The gate driving circuits 52 and 53 are arranged so that an output of the gate driving circuit 52 is supplied to the gate driving circuit 53, so that the gate driving circuits 52 and 53 sequentially operate.

First, the substrate is soaked in an electro-deposition solution for the color R, and the gate driving circuits 52 and 53 are caused to operate, by supplying a start pulse SP and a clock signal CLK. Similarly, in synchronization with the gate driving circuits 52 and 53, the source driving circuits 54 and 55 are caused to operate. Then, by applying a voltage for electro-deposition through terminals 56 and 57, the voltage is sequentially applied to pixel electrodes corresponding to the color R in the TFT arrays. By doing so, electro-deposited color filters are formed. Thus, by inputting signals for formation of color filters, color filters are formed with respect to not only pixel electrodes arranged so that one bus-line corresponds to pixels of one color, but also pixel electrodes arranged in other manners.

Subsequently, likewise, electro-deposited color filters of the colors G and B are formed. Processes before and after the color filter formation are the same as those in the fifth embodiment.

Since the electro-deposited color filters are thus formed by short-circuiting the source bus-lines of the vertically-disposed TFT substrates each other at the short-circuiting section 51, color filters are formed on a plurality of TFT substrates through one process each for the colors R, G, and B even in the case where a plurality of TFT substrates are formed on one insulating substrate, thereby simplifying the manufacturing processes.

Note that the present embodiment is described by taking as an example the case where two TFT substrates are vertically formed on one substrate, but the present invention is not limited to the present embodiment. Two TFT substrates may be provided side by side on one substrate, and color filters may be simultaneously formed thereon by short-circuiting corresponding gate bus-lines of the two TFT substrates. Besides, to manufacturing not less than 4 (=2 (in the vertical direction)×2 (in the horizontal direction)) TFT substrates from one substrate, color filters can be simultaneously formed with respect to not less than four TFT substrates, by short-circuiting the source bus-lines of the vertically corresponding TFT substrates while short-circuiting the gate bus-lines of the horizontally corresponding TFT substrates.

As shown in the fifth and sixth embodiments, the method for manufacturing an LCD device, whereby a plurality of TFT substrates are manufactured on one insulating substrate, is characterized in comprising the steps of (a) forming gate-use short rings by short-circuiting gate bus-lines of the TFT substrates, and forming three series of source-use short rings by short-circuiting short rings on the TFT substrates so that short rings belonging to a same series are short-circuited with each other, and (b) sequentially forming color filters on the TFT substrates by applying a voltage to the gate-use short rings while applying voltages to the source-use short rings.

According to the aforementioned manufacturing method, the formation of the color filters of the colors R, G, and B is finished through a single step each. Therefore, the color filter formation process can be drastically simplified. Besides, since the color filter formation-use signals are inputted by using the short rings without operations of the drivers, only a small number of signals are required, and hence the formation of the color filters can be carried out in a simple and easy manner.

In addition, it is preferable that the method further comprises the steps of (c) short-circuiting the three series of the source-use short rings and the gate-use short rings during processes prior to the color filter forming step, and (d) cancelling the short-circuiting just before the color filter forming step. With these steps, the switching element array is not damaged due to static electricity before the formation of the color filters, and dot-like defects do not occur. As a result, a high non-defective rate can be achieved regarding the TFT substrates.

Besides, it is preferable that the cancellation of the short-circuiting between the three series of the source-use short rings and the gate-use short rings is carried out by using laser. By doing so, static electricity is not generated in the process for cancelling the short-circuiting between the short rings, and hence the switching element array is not damaged. Unlike the case where the cancellation of short-circuiting between the short rings is carried out by scraping the glass, static electricity is not generated during the process. Moreover, during the process, dust which usually accompanies the cancellation of the short-circuiting does not appear.

Furthermore, it is preferable that the method further comprises the step of short-circuiting the three series of the source-use short rings and the gate-use short rings after the color filter forming step. By doing so, even though static electricity is generated in a subsequent process such as a rubbing process, the switching element array is by no means damaged, and hence dot-like defects do not occur. As a result, a high non-defective rate can be achieved regarding the TFT substrates.

It is also preferable that the short-circuiting of the three series of source-use short rings and the gate-use short rings are carried out by using laser. In the case where the short-circuiting is carried out with the use of other conductive materials such as silver paste, the conductive material becomes an impurity material and contaminates the device in subsequent processes such as washing process. But by the foregoing method, it does not occur.

The LCD device manufacturing method of the present invention, whereby a plurality of TFT substrates are manufactured on one insulating substrate, is characterized in comprising the steps of (1) forming a short-circuiting section for short-circuiting source bus-lines of at least two TFT substrates which are vertically provided, and (2) forming color filters simultaneously on the TFT substrates by utilizing pixel electrodes.

According to the above method, it is possible to simultaneously form color filters on a plurality of TFT substrates, only by providing the short-circuiting section. Besides, since there is no need to provide short rings in each TFT substrate, a dimension of areas where short rings occupy in each substrate, thereby resulting in that more TFT substrates can be obtained.

The LCD device manufacturing method of the present invention, whereby a plurality of TFT substrates are formed on one insulating substrate, is characterized in comprising the steps of (1) forming a short-circuiting section for short-circuiting source bus-lines of at least two TFT substrates which are provided side by side, and (2) forming color filters simultaneously on the TFT substrates by utilizing pixel electrodes.

According to the above method, it is possible to simultaneously form color filters on a plurality of TFT substrates, only by providing the short-circuiting section. Besides, since there is no need to provide short rings in each TFT substrate, a dimension of areas where short rings occupy in each substrate, thereby resulting in that more TFT substrates can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing a liquid crystal display device wherein a plurality of TFT substrates are manufactured on a single insulating substrate, said method comprising the steps of:

forming components for first and second TFT substrates on the single insulating substrate;

forming gate-use short rings for each of the first and second TFT substrates on said single insulating substrate by short-circuiting gate bus-lines of each of the TFT substrates, and forming a plurality of series of source-use short rings for each of the first and second TFT substrates on said single insulating substrate by short-circuiting short rings on each of the TFT substrates on said single insulating substrate so that short rings belonging to a same series for said first and second TFT substrates respectively, are short-circuited with each other; and sequentially forming color filters of each of the first and second TFT substrates on the single insulating substrate by applying a voltage to the gate-use short rings while applying voltages to the source-use short rings.

2. A method as set forth in claim 1, further comprising the steps of:

short-circuiting the plurality of series of the source-use short rings and the gate-use short rings during processes prior to said color filter forming step; and cancelling the short-circuiting just before said color filter forming step.

3. The method as set forth in claim 2, wherein the cancellation of the short-circuiting between the plurality of series of the source-use short rings and the gate-use short rings is carried out by using laser.

4. A method as set forth in claim 2, further comprising the step of:

short-circuiting the plurality of series of the source-use short rings and the gate-use short rings after said color filter forming step.

5. The method as set forth in claim 4, wherein the short-circuiting of the plurality of series of source-use short rings and the gate-use short rings are carried out by using laser.

6. The method of claim 1, wherein each of the first and second TFT substrates comprises a TFT array, a gate driver, and a source driver.

7. The method of claim 1, wherein the source-use short rings are not in direct electrical communication with the short circuited gate bus-lines during said forming of the color filters.

8. The method of claim 1, wherein the plurality of series of source-use short rings comprises three source-use short rings.

9. The method of claim 1, further comprising soaking the single insulating substrate in a color-filter-formation-use solution during said forming of said color filters.

10. The method of claim 9, wherein the solution is an electrodeposition solution.

11. The method claim 1, wherein said step of sequentially forming color filters of each of the first and second TFT substrates on the single insulating substrate by applying a voltage to the gate-use short rings while applying voltages to the source-use short rings is carried out in a manner such that color filters of the first and second TFT substrates are formed at the same time.

12. A method of forming a plurality of TFT substrates on one insulating substrate, said method comprising the steps of:

forming components for first and second TFT substrates on the one insulating substrate;

forming a short-circuiting section for short-circuiting source bus-lines of at least said first and second TFT substrates which are vertically provided; and forming color filters simultaneously for each of the first and second TFT substrates on the one insulating substrates by applying a voltage to pixel electrodes.

13. The method of claim 12, wherein each of the first and second TFT substrates comprises a TFT array, a gate driver, and a source driver.

14. The method of claim 12, wherein short circuited source bus-lines are not in electrical communication with gate lines during said forming of the color filters.

15. The method of claim 12, further comprising soaking the one insulating substrate in a color filter formation use solution during said forming of said color filters.

16. The method of claim 15, wherein the solution is an electrodeposition solution.

17. A method for manufacturing a liquid crystal display device, whereby a plurality of TFT substrates are formed on one insulating substrate, said method comprising the steps of:

forming a short-circuiting section for short-circuiting source bus-lines of at least two TFT substrates which are provided side by side on the one insulating substrate; and simultaneously forming color filters of the two TFT substrates on the one insulating substrate by applying a voltage to pixel electrodes.

18. The method of claim 17, wherein each of said two TFT substrates comprises a TFT array, a gate driver, and a source driver.

19. The method of claim 17, wherein short circuited source bus-lines are not in electrical communication with gate lines during said forming of the color filters.

20. The method of claim 17, further comprising soaking the one insulating substrate in a color filter formation use solution during said forming of said color filters.

21. The method of claim 20, wherein the solution is an electrodeposition solution.

22. A method for forming a plurality of TFT substrates on one insulating substrate, the method comprising:

forming components for first and second TFT substrates on the one insulating substrate;

forming a short-circuiting section for short-circuiting gate bus lines of at least the first and second TFT substrates which are provided side by side; and forming color filters simultaneously for each of the first and second TFT substrates on the one insulating substrate by applying a voltage to pixel electrodes.

* * * * *